United States Patent
Zhu et al.

(10) Patent No.: US 12,520,296 B2
(45) Date of Patent: Jan. 6, 2026

(54) BEAM MANAGEMENT USING ENHANCED SYNCHRONIZATION SIGNAL BLOCK SIGNALING

(71) Applicant: QUALCOMM Incorporated, San Diego, CA (US)

(72) Inventors: Jun Zhu, San Diego, CA (US); Yongle Wu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/939,770

(22) Filed: Sep. 7, 2022

(65) Prior Publication Data

US 2024/0080831 A1    Mar. 7, 2024

(51) Int. Cl.
*H04W 72/044* (2023.01)
*H04W 16/28* (2009.01)

(52) U.S. Cl.
CPC ......... *H04W 72/046* (2013.01); *H04W 16/28* (2013.01)

(58) Field of Classification Search
CPC . H04W 72/046; H04W 16/28; H04B 7/06952
USPC ........................................................ 370/330
See application file for complete search history.

(56) References Cited

U.S. PATENT DOCUMENTS

| | | | | |
|---|---|---|---|---|
| 10,271,317 B2 * | 4/2019 | Liu | ........................ | H04W 16/28 |
| 2020/0068616 A1 * | 2/2020 | Qian | .................... | H04W 72/046 |
| 2020/0212989 A1 * | 7/2020 | Reial | ..................... | H04B 7/0469 |
| 2020/0383071 A1 * | 12/2020 | Nangia | .................. | H04W 72/30 |
| 2021/0136703 A1 * | 5/2021 | Kundargi | .............. | H04L 5/0007 |
| 2022/0217660 A1 * | 7/2022 | Liu | ........................ | H04L 5/0094 |
| 2022/0225116 A1 * | 7/2022 | Li | ........................ | H04B 7/0695 |
| 2023/0006714 A1 * | 1/2023 | Mo | ....................... | H04B 7/0854 |
| 2023/0170948 A1 * | 6/2023 | Han | ..................... | H04B 7/0695 |
| 2023/0187847 A1 * | 6/2023 | Vejlgaard | ............. | H04B 7/0695 343/702 |
| 2023/0319772 A1 * | 10/2023 | Alawieh | ............... | H04W 16/28 455/456.1 |

(Continued)

FOREIGN PATENT DOCUMENTS

| | | | |
|---|---|---|---|
| CN | 111954221 A | * | 11/2020 |
| WO | WO-2021134572 A1 | * | 7/2021 |

(Continued)

*Primary Examiner* — Asad M Nawaz
(74) *Attorney, Agent, or Firm* — Holland & Hart LLP/Qualcomm Incorporated

(57) ABSTRACT

Methods, systems, and devices for wireless communications are described. The method may include a user equipment (UE) receiving a first set of multiple sets of synchronization signal block (SSB) signals from a network entity. The first set of multiple sets of SSB signals may be associated with a first antenna port of the network entity corresponding to a first polarization. Additionally, the UE may receive a second set of multiple sets of SSB signals from the network entity. The second set of multiple sets of SSB signals may be associated with a second antenna port of the network entity corresponding to a second polarization. The UE may then transmit an indication of a beam pair for communication between the UE and the network entity based at least in part on receiving the first set of multiple sets of SSB signals and the second set of multiple sets of SSB signals.

20 Claims, 19 Drawing Sheets

(56) References Cited

U.S. PATENT DOCUMENTS

2025/0274258 A1* 8/2025 Zhang ............... H04W 72/0446
2025/0274881 A1* 8/2025 Huang ............... H04W 56/0035

FOREIGN PATENT DOCUMENTS

WO   WO-2021244201 A1 * 12/2021
WO   WO-2023085593 A1 *  5/2023   ............ H04W 88/02

* cited by examiner

BEAM MANAGEMENT USING ENHANCED SYNCHRONIZATION SIGNAL BLOCK SIGNALING

FIELD OF TECHNOLOGY

The following relates to wireless communications, including beam management using enhanced synchronization signal block (SSB) signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support beam management using enhanced synchronization signal block (SSB) signaling. For example, the described techniques provide for a user equipment (UE) to utilize measurements of enhanced SSBs for beam management procedures. In some examples, the UE may receive a first set of SSBs from a network entity. The first set of SSBs may be associated with a first antenna port of the network entity and correspond to a first polarization and each SSB of the first set may be associated with respective directional beams of a set of directional beams. Additionally, the UE may receive a second set of SSBs from the network entity. The second set of SSBs may be associated with a second antenna port of the network entity corresponding to a second polarization and each second SSB of the second set may be associated with respective directional beams of the set of directional beams. The UE may measure the first set of SSBs and the second set of SSBs and select a beam pair based on the measurements. The UE may then transmit an indication of the selected beam pair to the network entity.

A method for wireless communication at a UE is described. The method may include receiving a first set of multiple sets of SSB signals from a network entity, where the first set of multiple sets of SSB signals are associated with a first antenna port of the network entity corresponding to a first polarization and are associated with respective directional beams of a set of directional beams, receiving a second set of multiple sets of SSB signals from the network entity, where the second set of multiple sets of SSB signals are associated with a second antenna port of the network entity corresponding to a second polarization and are associated with respective directional beams of the set of directional beams, and transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

An apparatus for wireless communication at a UE is described. The apparatus may include a memory, a transceiver, and at least one processor of a UE, the at least one processor coupled with the memory and the transceiver. The at least one processor may be configured to cause the apparatus to receive a first set of multiple sets of SSB signals from a network entity, where the first set of multiple sets of SSB signals are associated with a first antenna port of the network entity corresponding to a first polarization and are associated with respective directional beams of a set of directional beams, receive a second set of multiple sets of SSB signals from the network entity, where the second set of multiple sets of SSB signals are associated with a second antenna port of the network entity corresponding to a second polarization and are associated with respective directional beams of the set of directional beams, and transmit an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

Another apparatus for wireless communication at a UE is described. The apparatus may include means for receiving a first set of multiple sets of SSB signals from a network entity, where the first set of multiple sets of SSB signals are associated with a first antenna port of the network entity corresponding to a first polarization and are associated with respective directional beams of a set of directional beams, means for receiving a second set of multiple sets of SSB signals from the network entity, where the second set of multiple sets of SSB signals are associated with a second antenna port of the network entity corresponding to a second polarization and are associated with respective directional beams of the set of directional beams, and means for transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

A non-transitory computer-readable medium storing code for wireless communication at a UE is described. The code may include instructions executable by a processor to receive a first set of multiple sets of SSB signals from a network entity, where the first set of multiple sets of SSB signals are associated with a first antenna port of the network entity corresponding to a first polarization and are associated with respective directional beams of a set of directional beams, receive a second set of multiple sets of SSB signals from the network entity, where the second set of multiple sets of SSB signals are associated with a second antenna port of the network entity corresponding to a second polarization and are associated with respective directional beams of the set of directional beams, and transmit an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

Some examples of the method, apparatuses, and non-transitory computer-readable medium described herein may further include operations, features, means, or instructions for receiving the first set of multiple sets of SSB signals includes receiving the first set of multiple sets of SSB signals using a first set of time resources and receiving the second set of multiple sets of SSB signals includes receiving the second set of multiple sets of SSB signals using a second set of time resources, where the first set of time resources may be different from the second set of time resources.

Some examples of the method, apparatuses, and non-transitory computer-readable medium described herein may further include operations, features, means, or instructions for receiving the first set of multiple sets of SSB signals includes receiving the first set of multiple sets of SSB signals using a first set of frequency resources and receiving the second set of multiple sets of SSB signals includes receiving the second set of multiple sets of SSB signals using a second set of frequency resources, where the first set of frequency resources may be different from the second set of frequency resources.

Some examples of the method, apparatuses, and non-transitory computer-readable medium described herein may further include operations, features, means, or instructions for receiving the first set of multiple sets of SSB signals includes using a first receive beam to receive a first set of SSB signals associated with a first transmit beam of the network entity, the first transmit beam included in the set of directional beams and receiving the second set of multiple sets of SSB signals includes using the first receive beam to receive a second set of SSB signals associated with the first transmit beam of the network entity.

In some examples of the method, apparatuses, and non-transitory computer-readable medium described herein, receiving the second set of multiple sets of SSB signals may include operations, features, means, or instructions for receiving, after receiving a first set of SSB signals included in the first set of multiple sets and prior to receiving a second set of SSB signals included in the first set of multiple sets, a third set of SSB signals included in the second set of multiple sets, where the third set of SSB signals may be associated with a same directional beam of the set of directional beams as the first set of SSB signals.

In some examples of the method, apparatuses, and non-transitory computer-readable medium described herein, receiving the second set of multiple sets of SSB signals may include operations, features, means, or instructions for receiving, via a first set of time resources that at least partially overlaps with a second set of time resources used to receive a first set of SSB signals included in the first set of multiple sets, a second set of SSB signals included in the second set of multiple sets.

In some examples of the method, apparatuses, and non-transitory computer-readable medium described herein, a first set of frequency resources used to receive the first set of SSB signals may be different from a second set of frequency resources used to receive the second set of SSB signals.

Some examples of the method, apparatuses, and non-transitory computer-readable medium described herein may further include operations, features, means, or instructions for selecting the beam pair based on measurements of the first set of multiple sets of SSB signals and measurements of the second set of multiple sets of SSB signals.

In some examples of the method, apparatuses, and non-transitory computer-readable medium described herein, one of the first polarization and the second polarization includes a vertical polarization and another of the first polarization and the second polarization includes a horizontal polarization.

A method for wireless communication at a network entity is described. The method may include transmitting a first set of multiple sets of SSB signals via a first antenna port corresponding to a first polarization, where the first set of multiple sets of SSB signals are transmitted using respective directional beams of a set of directional beams, transmitting a second set of multiple sets of SSB signals via a second antenna port corresponding to a second polarization, where the second set of multiple sets of SSB signals are transmitted using respective directional beams of the set of directional beams, and receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

An apparatus for wireless communication at a network entity is described. The apparatus may include a memory and at least one processor of a network entity, the at least one processor coupled with the memory, the at least one processor may be configured to cause the apparatus to transmit a first set of multiple sets of SSB signals via a first antenna port corresponding to a first polarization, where the first set of multiple sets of SSB signals are transmitted using respective directional beams of a set of directional beams, transmit a second set of multiple sets of SSB signals via a second antenna port corresponding to a second polarization, where the second set of multiple sets of SSB signals are transmitted using respective directional beams of the set of directional beams, and receive an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

Another apparatus for wireless communication at a network entity is described. The apparatus may include means for transmitting a first set of multiple sets of SSB signals via a first antenna port corresponding to a first polarization, where the first set of multiple sets of SSB signals are transmitted using respective directional beams of a set of directional beams, means for transmitting a second set of multiple sets of SSB signals via a second antenna port corresponding to a second polarization, where the second set of multiple sets of SSB signals are transmitted using respective directional beams of the set of directional beams, and means for receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

A non-transitory computer-readable medium storing code for wireless communication at a network entity is described. The code may include instructions executable by a processor to transmit a first set of multiple sets of SSB signals via a first antenna port corresponding to a first polarization, where the first set of multiple sets of SSB signals are transmitted using respective directional beams of a set of directional beams, transmit a second set of multiple sets of SSB signals via a second antenna port corresponding to a second polarization, where the second set of multiple sets of SSB signals are transmitted using respective directional beams of the set of directional beams, and receive an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

Some examples of the method, apparatuses, and non-transitory computer-readable medium described herein may further include operations, features, means, or instructions for transmitting the first set of multiple sets of SSBs includes transmitting the first set of multiple sets of SSB signals using a first set of time resources and transmitting the second set of multiple sets of SSB signals includes transmitting the second set of multiple sets of SSB signals using a second set of time resources, where the first set of time resources may be different from the second set of time resources.

Some examples of the method, apparatuses, and non-transitory computer-readable medium described herein may further include operations, features, means, or instructions for transmitting the first set of multiple sets of SSB signals includes transmitting the first set of multiple sets of SSB signals using a first set of frequency resources and transmitting the second set of multiple sets of SSB signals includes transmitting the second set of multiple sets of SSB signals using a second set of frequency resources, where the first set of frequency resources may be different from the second set of frequency resources.

Some examples of the method, apparatuses, and non-transitory computer-readable medium described herein may further include operations, features, means, or instructions for transmitting the first set of multiple sets of SSB signals includes transmitting a first set of SSB signals via the first antenna port using a first transmit beam of the set of directional beams the first transmit beam included in the set of directional beams and transmitting the second set of multiple sets of SSB signals includes transmitting a second set of SSB signals via the second antenna port using the first transmit beam.

In some examples of the method, apparatuses, and non-transitory computer-readable medium described herein, transmitting the second set of multiple sets of SSB signals may include operations, features, means, or instructions for transmitting, after transmitting a first set of SSB signals included in the first set of multiple sets and prior to transmitting a second set of SSB signals included in the first set of multiple sets, a third set of SSB signals included in the second set of multiple sets, where the third set of SSB signals may be transmitted using a same directional beam of the set of directional beams as the first set of SSB signals.

In some examples of the method, apparatuses, and non-transitory computer-readable medium described herein, transmitting the second set of multiple sets of SSB signals may include operations, features, means, or instructions for transmitting, via a first set of time resources that at least partially overlaps with a second set of time resources used to transmit a first set of SSB signals included in the first set of multiple sets, a second set of SSB signals included in the second set of multiple sets.

In some examples of the method, apparatuses, and non-transitory computer-readable medium described herein, a first set of frequency resources used to transmit the first set of SSB signals may be different from a second set of frequency resources used to transmit the second set of SSB signals.

Some examples of the method, apparatuses, and non-transitory computer-readable medium described herein may further include operations, features, means, or instructions for generating the first set of multiple sets of SSB signals based on a first precoding matrix and generating the second set of multiple sets of SSB signals based on a second precoding matrix, where a combination of the first precoding matrix and the second precoding matrix includes a rank-2 precoding matrix.

In some examples of the method, apparatuses, and non-transitory computer-readable medium described herein, one of the first polarization and the second polarization includes a vertical polarization and another of the first polarization and the second polarization includes a horizontal polarization.

DETAILED DESCRIPTION

In some examples, a user equipment (UE) may perform a beam management procedure with a network entity to determine a best directional beam to use while communicating with the network entity. During the beam management procedure, the network entity may transmit a series of synchronization signal blocks (SSBs) to the UE using different directional beams. The UE may measure a signal strength of the received SSBs and select a directional beam that corresponds to the highest measured signal strength. The UE may then report the selected directional beam to the network entity. In some cases, SSB signals may be examples of rank 1 signals and as such, the selected directional beam may be based on measurements of rank 1 signals. However, in some examples, the UE may implement multiple-input multiple-output (MIMO) when communicating with the network entity, and the directional beam selected based on the measurements of rank 1 signals may not optimize rank 2 application such as MIMO.

In some cases, the network entity and the UE may utilize enhanced SSBs as described herein for the purpose of beam management. The network entity may transmit a first set of SSBs using a first polarization (e.g., horizontal polarization), where each SSB of the first set may be transmitted using a different directional beam of a set of directional beams. Additionally, the network entity may transmit a second set of SSBs using a second polarization (e.g., vertical polarization), where each SSB of the second set may be transmitted using a different directional beam of the set of directional beams. In some examples, the first set of SSBs and the second set of SSBs may be interleaved in time (e.g., time domain multiplexing (TDM)) or in frequency (e.g., frequency domain multiplexing (FDM)). The UE may measure the signal strength of the first set of SSBs and the second set of SSBs and combine the signal strength measurements of SSB pairs (e.g., SSB of the first set and SSB of the second set that correspond to a same directional beam). The UE may then select the directional beam that corresponds to the highest signal strength measurement and report the selected directional beam to the network entity. Using such methods may allow a UE to select a directional beam that may optimize rank 2 signaling.

Aspects of the disclosure are initially described in the context of wireless communications systems. Additional aspects of the disclosure are described in the context of a TDM scheme, a FDM scheme, and a process flow. Aspects of the disclosure are further illustrated by and described with reference to apparatus diagrams, system diagrams, and flowcharts that relate to beam management using enhanced SSB signaling.

Figure 1:
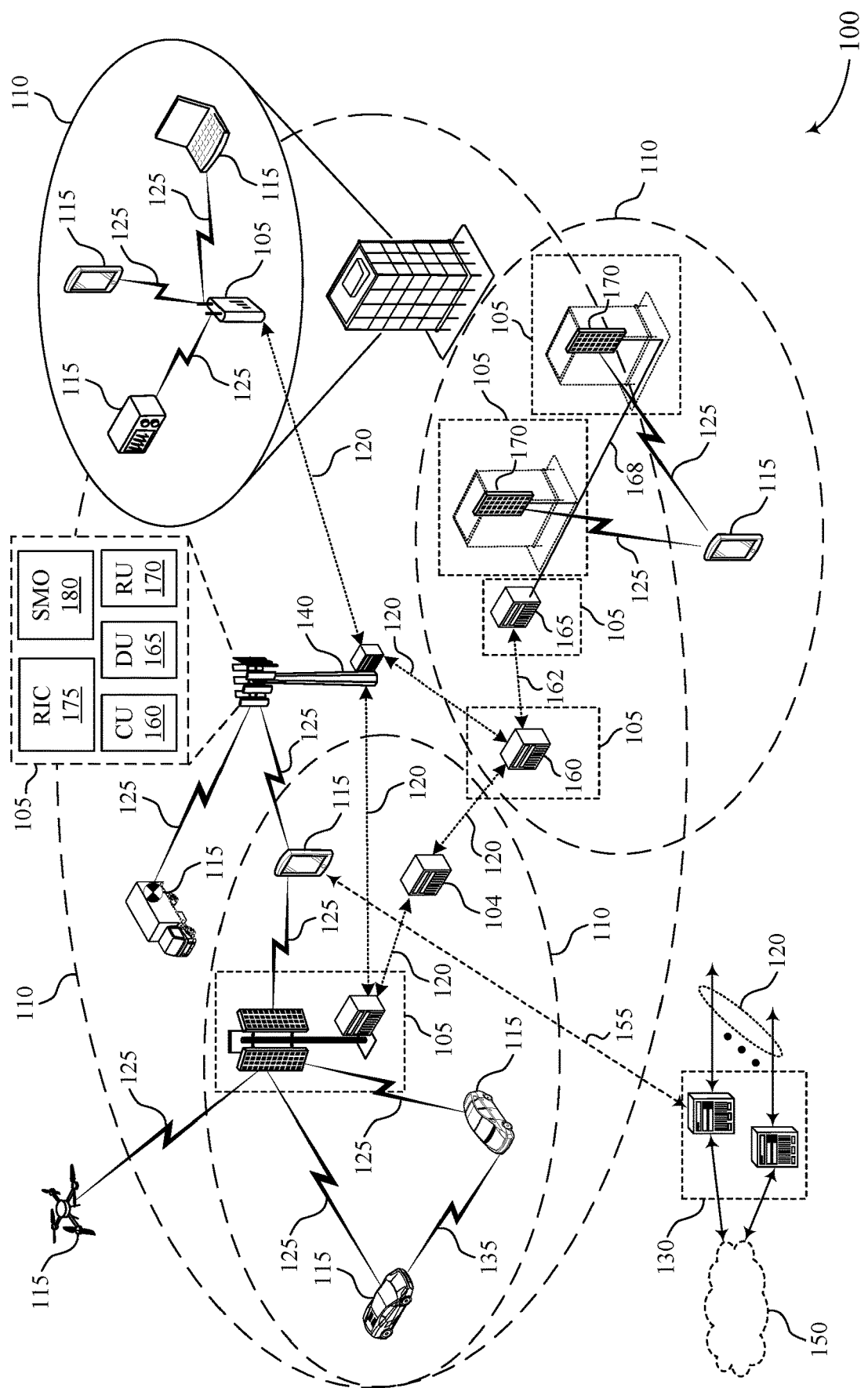
FIGS. 1 and 2 illustrate examples of a wireless communications system that supports beam management using enhanced synchronization signal block (SSB) signaling in accordance with one or more aspects of the present disclosure.

FIG. 1 illustrates an example of a wireless communications system 100 that supports beam management using enhanced SSB signaling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support beam management using enhanced SSB signaling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of TDM techniques, FDM techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein, the UE 115 may utilize measurements of enhanced SSBs for beam management procedures. In some examples, the UE 115 may receive a first set of SSBs from the network entity 105. The first set of SSBs may be associated with a first antenna port of the network entity 105 and correspond to a first polarization and each SSB of the first set may be associated with respective directional beams of a set of directional beams. Additionally, the UE 115 may receive a second set of SSBs from the network entity 105. The second set of SSBs may be associated with a second antenna port of the network entity corresponding to a second polarization and each second SSB of the second set may be associated with respective directional beams of the set of directional beams. The UE 115 may measure the first set of SSBs and the second set of SSBs and select a beam pair based on the measurements. The UE 115 may then transmit an indication of the selected beam pair to the network entity 105. The methods as described herein may allow the UE 115 to select a beam pair that may optimize rank 2 communication.

Figure 2:
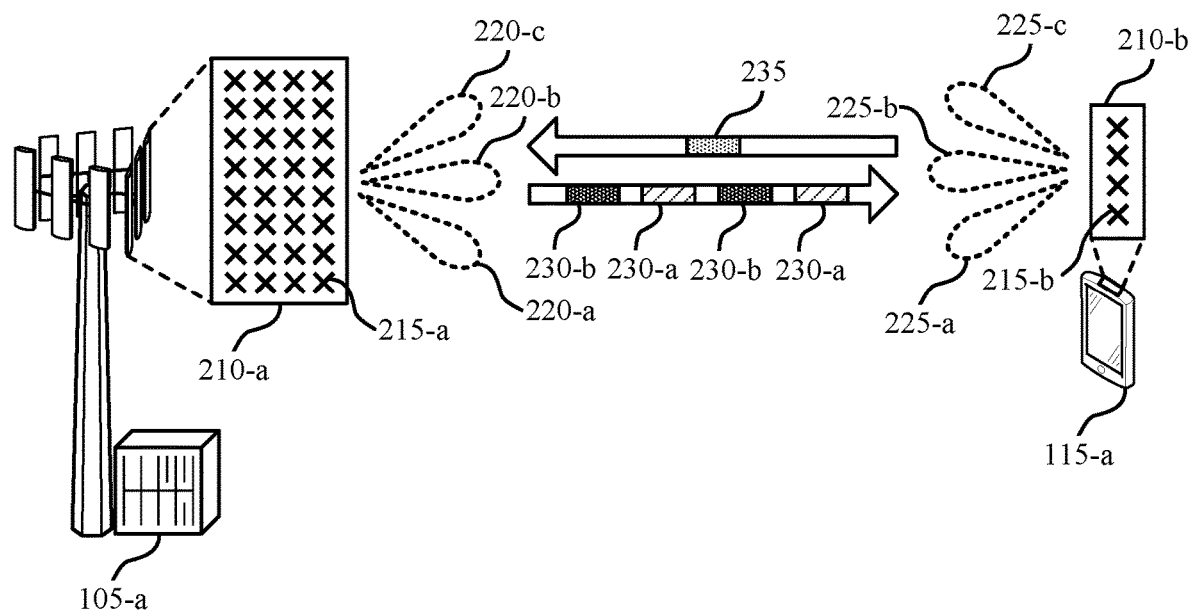

FIG. 2 illustrates an example of a wireless communications system 200 that supports beam management using enhanced SSB signaling in accordance with one or more aspects of the present disclosure. In some examples, the wireless communications system 200 may implement aspects of a wireless communications system 100. For example, the wireless communications system 200 may include a network entity 105-*a* which may be an example of a network entity 105 as described with reference to FIG. 1. Additionally, the wireless communications system 200 may include a UE 115-*a* which may be an example of a UE 115 as described with reference to FIG. 1.

In some examples, a network device of the wireless communications system 200 (e.g., the UE 115-*a* or the network entity 105-*a*) may include an antenna panel 210. For example, the network entity 105-*a* may include an antenna panel 210-*a* and the UE 115-*a* may include an antenna panel 210-*b*. Moreover, each antenna panel 210 may include multiple physical antenna elements 215. For example, the antenna panel 210-*a* may include four columns of antenna elements 215-*a* and the antenna panel 210-*b* may include one column of antenna elements 215-*b*. The way in which the network device may utilize the antenna elements 215 of the antenna panel 210 may depend on a transmission mode of the network device.

In some examples, the network device may select the transmission mode based on a rank of the signal being transmitted. The rank may indicate a number of independent data streams that can be transmitted simultaneously. For a rank 1 signal, the network device may select transmit diversity (e.g., transmission mode 2) or single antenna transmission (e.g., transmission mode 1). Using transmit diversity, the network device may transmit the same data stream via more than one antenna port simultaneously. For a rank 2 signal, the network device may select MIMO (e.g., transmission mode 3). Using MIMO, the network device may transmit two different data streams via more than one antenna port simultaneously. An antenna port may be mapped to one or more physical antenna elements 215. Each antenna port may have a corresponding resource grid and signals transmitted via a same antenna port may undergo identical channel conditions.

In some examples, the antenna ports over which the two data streams are transmitted (e.g., during MIMO and transmit diversity) may correspond to different polarizations. The two different types of polarization may include vertical polarization and horizontal polarization or slant −45 polarization and slant 45 polarization. In one example, a first antenna port may be mapped to a first antenna element 215 that has a first polarization and a second antenna port may be mapped to a second antenna element 215 that has a second polarization, where the first polarization and the second polarization are different from one another. For transmit diversity, the network device may transmit a signal corresponding to the data stream via the first antenna port corresponding to the first polarization and may transmit a signal corresponding to the same data stream via the second port corresponding to the second polarization. For MIMO, the network device may transmit a signal corresponding to the data stream via the first port corresponding to the first polarization and may transmit a signal corresponding to a different data stream via the second port corresponding to the second polarization.

In some examples, precoding procedures may be different for different signal ranks. For example, for rank 1 signals, the transmitting network device may apply a linear precoder during the precoding operation. Using a linear precoder may effectively collapse the antenna ports (e.g., the horizontal and vertical antenna ports) at the transmitting network device and the receiving network device may receive a mixed polarization signal via each of its antenna ports (e.g., horizontal and vertical antenna ports).

As one example, the linear precoding matrix may be [1;1]. In such example, the channel information matrix h seen by the receiving network device may be represented by Equation 1. The channel information matrix h may indicate an amount of data going through different data paths between the network entity 105-*a* and the UE 115-*a*. As seen in Equation 1, applying the linear precoder may reduce the channel information matrix h from a two by two matrix to a two by one matrix. The two by two channel information matrix h may be representative all of the possible data paths between the transmitting network device and the receiving network device. For example, $h_{01}$ may represent the data path between a first antenna port at the receiving network device and a first antenna port at the transmitting network device, $h_{02}$ may represent the data path between the first antenna port at the receiving network device and a second antenna port at the transmitting network device, $h_{11}$ may represent a data path between a second antenna port at the receiving network device and a first antenna port at the transmitting network device, and $h_{12}$ may represent a data path between a second antenna port at the receiving network device and a second antenna port at the transmitting network device. The two by one matrix, on the other hand, may represent different combinations (or sums) of the data paths.

$$\begin{bmatrix} h_{01} & h_{02} \\ h_{11} & h_{12} \end{bmatrix} \begin{bmatrix} 1 \\ 1 \end{bmatrix} = \begin{bmatrix} h_{01} + h_{02} \\ h_{11} + h_{12} \end{bmatrix} \quad (1)$$

In some examples, the network devices of the wireless communications system 200 may perform beam management operations. For example, the network entity 105-*a* may perform a beam management operation with the UE 115-*a* in order to determine a beam pair for subsequent communication with the UE 115-*a*. During the beam management operation, the network entity 105-*a* may transmit a series of SSBs 230 (e.g., SSB burst) to the UE 115-*a*. In some examples, the network entity 105-*a* may utilize a different directional beam 220 when transmitting each of the SSBs 230 in the series. For example, the network entity 105-*a* may transmit a first SSB 230 using a directional beam 220-*a*, a second SSB 230 using a directional beam 220-*b*, and a third SSB 230 using a directional beam 220-*c*. In some examples, the network entity 105-*a* may transmit the series of SSBs 230 according to some periodicity (e.g., every 5, 10, 20, 40, 80, or 160 milliseconds) and a number of SSBs 230 in the series of SSBs 230 may be equal to 20.

The UE 115-*a* may receive the series of SSBs 230 using a set of directional beams 225 (e.g., a directional beam 225-*a*, a directional beam 225-*b*, and a directional beam 225-*c*) and measure a signal strength (e.g., reference signal received power (RSRP)) of the SSBs 230. The UE 115-*a* may select a beam pair (e.g., a directional beam 220 and a directional beam 225) that corresponds to a highest signal strength value and transmit a beam report 235 to the network entity 105-*a* indicating the selected beam pair. SSBs 230 may be an example of rank 1 signals. As such, for each SSB 230, the metric used to determine a signal strength of the SSBs 230 may depend on a sum of the polarizations over the two receive antenna ports of the UE 115-a. Equation 2 illustrates an example of a beam selection metric that the UE 115-a may utilize to determine the signal strength of each SSB 230. Therefore, the UE 115-a may determine the best beam pair for rank 1 signals. However, in some examples, the network entity 105-a and the UE 115-a may exchange rank 2 signals and the best beam pair determined from rank 1 signal measurements (e.g., SSB measurements) may not be the best beam for rank 2 signaling. That is, beam selection based on SSBs 230 is limited to optimizing rank 1 signaling.

$$\text{beam selection metric} = |h_{01} + h_{02}|^2 + |h_{11} + h_{12}|^2 \tag{2}$$

As described herein, the network devices of the wireless communications system 200 may utilize enhanced SSBs 230 during beam management procedure. In such example, a network entity 105-a may transmit a series of SSBs 230 to the UE 115-a. The series of SSBs 230 may include a set of SSBs 230-a and a set of SSBs 230-b. The network entity 105-a may transmit the set of SSBs 230-a via a first antenna port corresponding to a first polarization using the set of directional beams 220. Additionally, the network entity 105-b may transmit the set of SSBs 230-a via a second antenna port corresponding to a second polarization using the set of directional beams 220.

In some examples, the network entity 105-a may interleave the set of SSBs 230-a and the set of SSBs 230-b. As one example, the network entity 105-a may interleave the set of SSBs 230-a and the set of SSBs 230-b in a time domain. In such example, the network entity 105-a may transmit a first SSB 230-a followed by a first SSB 230-b followed by a second SSB 230-a followed by a second SSB 230-b. In some examples, an SSB 230-a and the SSB 230-b directly following the SSB 230-a may be transmitted using the same directional beam 220. For example, the first SSB 230-a and the first SSB 230-b may be transmitted using the directional beam 220-a and the second SSB 230-a and the second SSB 230-b may be transmitted using the directional beam 220-b.

Alternatively, the network entity 105-a may interleave the set of SSBs 230-a and the set of SSBs 230-b in a frequency domain. For example, the network entity 105-a may transmit a first SSB 230-a and a first SSB 230-b using a first set of time resources followed by a second SSB 230-a and a second SSB 230-b using a second set of time resources. In some examples, an SSB 230-a and an SSB 230-b that occupy the same set of time resources may be transmitted using the same directional beam 220. For example, the first SSB 230-a and the first SSB 230-b may be transmitted using the directional beam 220-a and the second SSB 230-a and the second SSB 230-b may be transmitted using the directional beam 220-b. In some examples, each SSB pair (e.g., SSB 230-a and SSB 230-b transmitted using a same directional beam 220) may be received at the UE 115-a using a same directional beam 225.

In some examples, the network entity 105-a may apply a first precoding matrix to the set of SSBs 230-a and a second precoding matrix to the set of SSBs 230-b. A combination of the first precoding matrix and the second precoding matrix may form a rank 2 precoding matrix or a unitary matrix. As such, for each SSB pair, the UE 115-a may have the ability to see the full channel matrix (e.g., may be able to separate all of the possible data paths). As an example, the first precoding matrix may be [1;0] and the second precoding matrix may be [0;1]. As another example, the first precoding matrix may be [1,1] and the second precoding matrix may be [1,−1]. The possible channel seen by the UE 115-a for each SSB pair is represented by Equation 3 and Equation 4. The UE 115-a may measure the signal strength of each SSB pair and select a beam pair that corresponds to the highest signal strength value. Equation 5 illustrates an example of a beam selection metric that the UE 115-a may utilize to determine the signal strength of each SSB pair. The UE 115-a may then transmit the beam report 235 indicating the selected beam pair. In some examples, the network entity 105-a and the UE 115-a may utilize the beam pair indicated in the beam report when communicating rank 2 signals. By utilizing the enhanced SSBs 230, the UE 115-a may be able to optimize rank 2 performance.

$$\begin{bmatrix} h_{01} & h_{02} \\ h_{11} & h_{12} \end{bmatrix} \begin{bmatrix} 1 & 0 \\ 0 & 1 \end{bmatrix} = \begin{bmatrix} h_{01} & h_{02} \\ h_{11} & h_{12} \end{bmatrix} \tag{3}$$

$$\frac{1}{\sqrt{2}} \begin{bmatrix} h_{01} & h_{02} \\ h_{11} & h_{12} \end{bmatrix} \begin{bmatrix} 1 & 1 \\ 1 & -1 \end{bmatrix} = \frac{1}{\sqrt{2}} \begin{bmatrix} h_{01} + h_{02} & h_{01} - h_{02} \\ h_{11} + h_{12} & h_{11} - h_{12} \end{bmatrix} \tag{4}$$

$$\text{beam selection metric} = |h_{01}|^2 + |h_{02}|^2 + |h_{11}|^2 + |h_{12}|^2 \tag{5}$$

Figure 3:
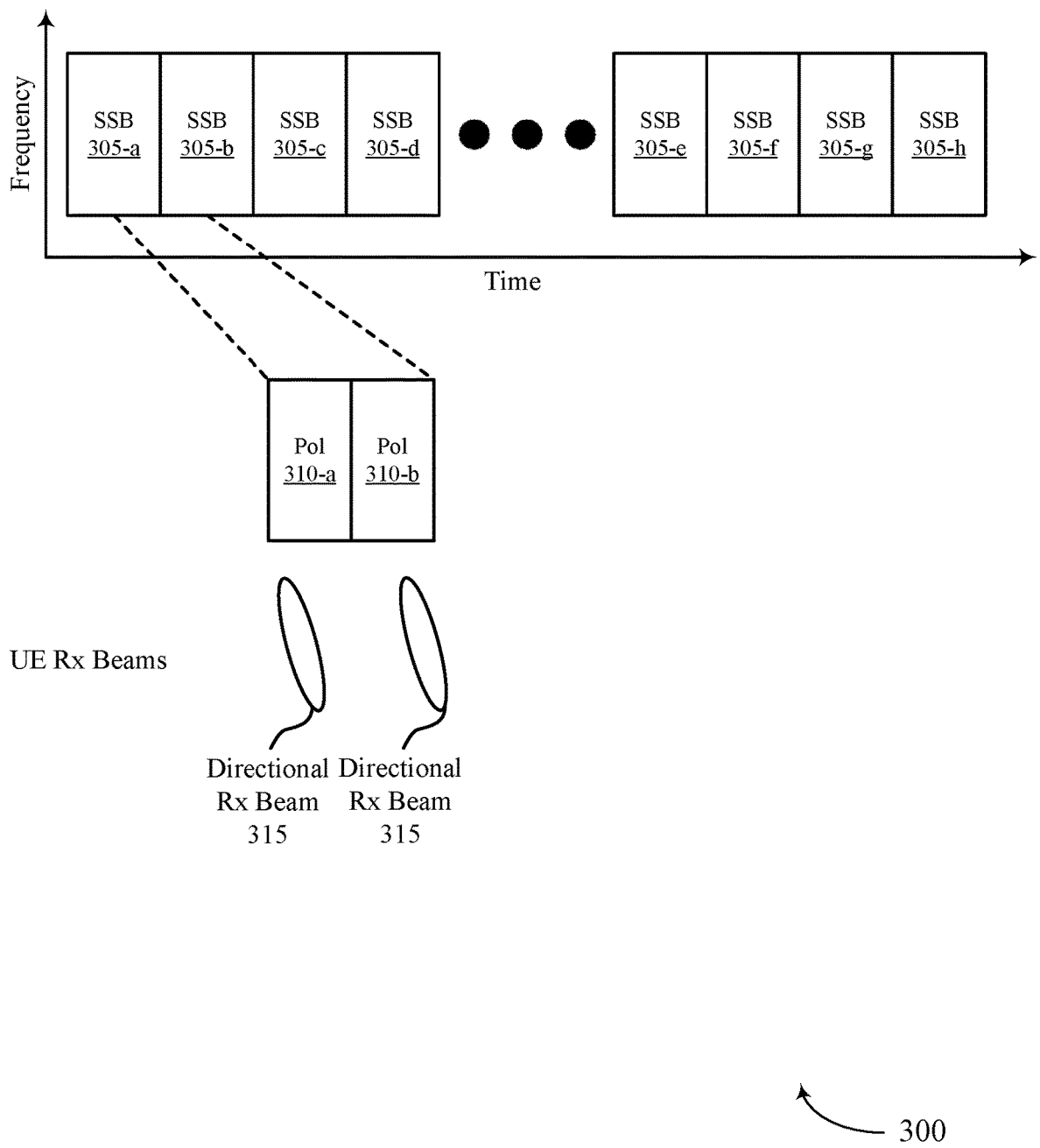
FIG. 3 illustrates an example of a time domain multiplexing (TDM) scheme that supports beam management using enhanced SSB signaling in accordance with one or more aspects of the present disclosure.

FIG. 3 illustrates an example of a TDM scheme 300 that supports beam management using enhanced SSB signaling in accordance with one or more aspects of the present disclosure. In some examples, the TDM scheme 300 may implement or be implemented by aspects of a wireless communications system 100 and a wireless communications system 200. For example, the TDM scheme 300 may be implemented by a UE 115 or a network entity 105 as described with reference to FIGS. 1 and 2.

As described in FIG. 2, during a beam management procedure, the network entity may transmit a set of SSBs 305 (e.g., an SSB 305-a, an SSB 305-b, an SSB 305-c, an SSB 305-d, an SSB 305-e, an SSB 305-f, an SSB 305-g, and an SSB 305-h) to the UE using a set of directional transmit beams. In some examples, the network entity may transmit a first subset of the set of SSBs 305 via a first antenna port corresponding to a polarization 310-a (e.g., a horizontal polarization) and a second subset of the set of SSBs 305 via a second antenna port corresponding to a polarization 310-b (e.g., a vertical polarization).

In the example of FIG. 3, the network entity may arrange the set of SSBs 305 according to the TDM scheme 300. That is, each SSB 305 may occupy different time resources, but may occupy the same or overlapping frequency resources as the other SSBs in the set. According to a first TDM scheme, the network entity may interleave the first subset of the set of SSBs 305 (e.g., transmitted via polarization 310-a) with the second subset of the set of SSBs 305 (e.g., transmitted via polarization 310-a) in time. In such example, the first subset of the set of SSBs 305 may include the SSB 305-a, the SSB 305-c, the SSB 305-e, and the SSB 305-g and the second subset of the set of SSBs 305 may include the SSB 305-b, the SSB 305-d, the SSB 305-f, and the SSB 305-h.

According to a second TDM scheme, the network entity may transmit the first subset of the set of SSBs 305 followed by the second subset of the set of SSBs 310. In such example, the first subset of the set of SSBs 305 may include the SSB 305-a, the SSB 305-b, the SSB 305-c, and the SSB 305-d and the second subset of the set of SSBs 305 may include the SSB 305-e, the SSB 305-f, the SSB 305-g, and the SSB 305-h. Other TDM schemes in which SSBs 305 of the set occupy different time resources are possible.

Further, the network entity may utilize a same directional transmit beam to transmit a pair of SSBs 305. An SSB pair may include an SSB 305 of the first subset and an SSB 305 of the second subset. For the first TDM scheme, the SSB pair may include an SSB 305 of the first subset and an SSB of the second subset that directly follows the SSB 305 of the first subset. For example. a first SSB pair may include the SSB 305-*a* and the SSB 305-*b*. A second SSB pair may include the SSB 305-*c* and the SSB 305-*d*. A third SSB pair may include the SSB-e and the SSB 305-*d*. A fourth SSB pair may include the SSB 305-*g*, and the SSB 305-*h*. The network entity may transmit the first SSB pair using a first directional transmit beam, the second SSB pair using a second directional transmit beam, the third SSB pair using a third directional transmit beam, and the fourth SSB pair using a fourth directional beam.

For the second TDM scheme, the network entity may transmit each consecutive SSB 305 in the first subset using different directional transmit beams of the set and transmit each consecutive SSB 305 of the second subset using a different directional transmit beam of the set. For example, the network entity may transmit the SSB 305-*a* and the SSB 305-*e* using a first directional transmit beam, the SSB 305-*b* and the SSB 305-*f* using a second directional transmit beam, the SSB 305-*c* and the SSB 305-*g* using a third directional transmit beam, and the SSB 305-*d* and the SSB 305-*h* using a fourth directional transmit beam. In the end, the UE may receive one SSB for each type of polarization and each directional transmit beam of the set. As one example, the polarization types may include two different types of polarization (e.g., polarization 310-*a* and polarization 310-*b*) and the set of directional transmit beams may include 20 beams. In such example, the set of SSBs 305 may include 40 SSBs.

Additionally, the UE may receive each SSB pair using a same directional receive beam 315. As described above, a pair of SSB may include an SSB 305 of the first subset and an SSB of the second subset that are transmitted using a same directional transmit beam of the network entity. For the first TDM scheme, the first SSB pair may include the SSB 305-*a* and the SSB 305-*b*. As such, the UE may receive the SSB 305-*a* and the SSB 305-*b* using a same directional receive beam 315.

Further, the network entity may generate the set of SSBs 305 by applying a respective precoder to the set of SSBs 305. In some examples, the network entity may apply a first precoder to the first subset of SSBs 305 and a second precoder to the second subset of SSBs 305. A combination of the first precoder and the second precoder may be a rank 2. The UE may confirm that the combination of the first precoder and the second precoder is a rank 2 precoder if a result of performing decomposition (e.g., SVD) on the received signal (e.g., the SSB pair) is a matrix including two non-zero eigenvalues. An example of the first precoder may be [1;0] and the corresponding second precoder may be [0;1]. In such example, the combination of the first precoder and the second precoder may be [10;01].

Figure 4:
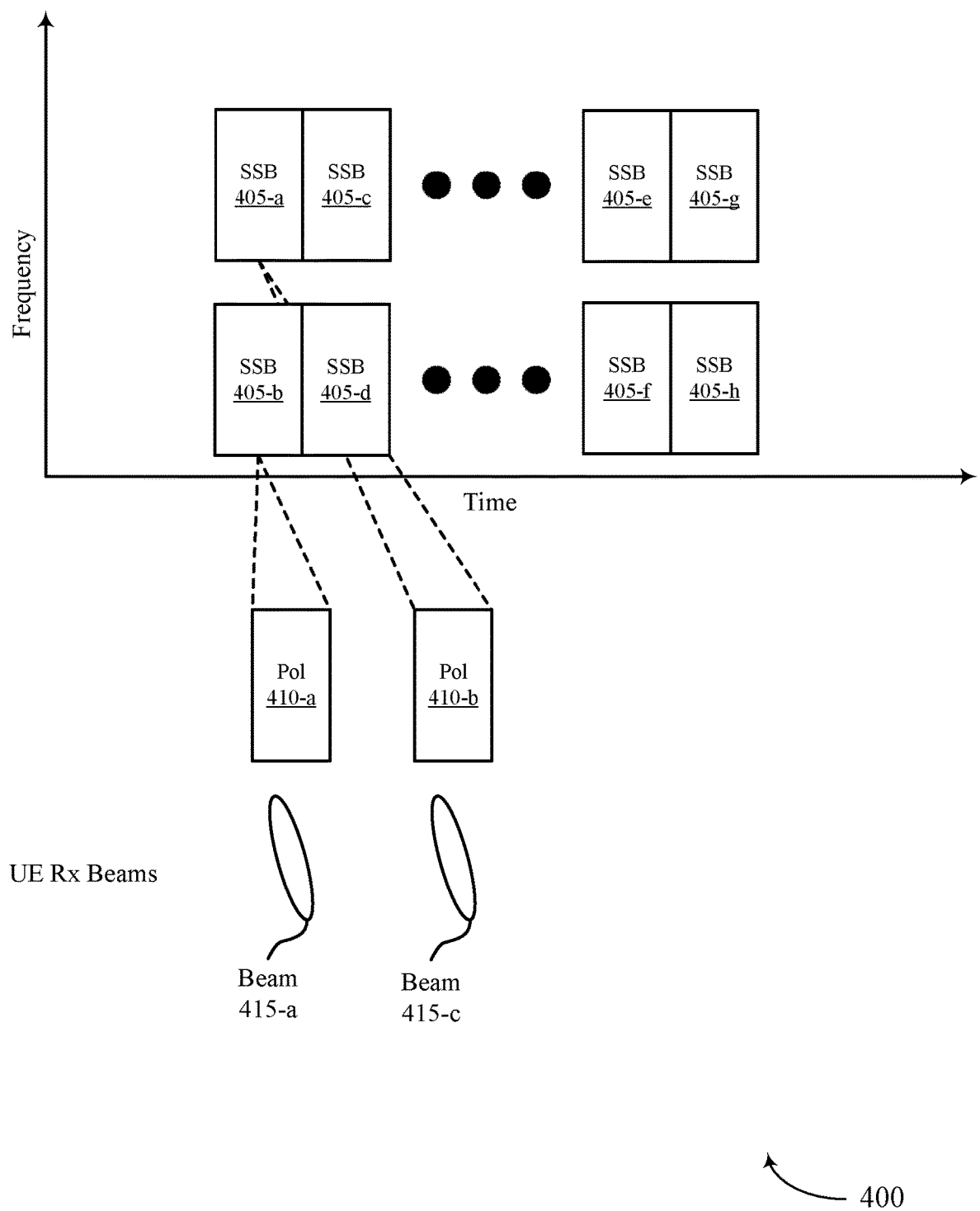
FIG. 4 illustrates an example of a frequency division multiplexing (FDM) scheme that supports beam management using enhanced SSB signaling in accordance with one or more aspects of the present disclosure.

FIG. 4 illustrates an example of a FDM scheme 400 that supports beam management using enhanced SSB signaling in accordance with one or more aspects of the present disclosure. In some examples, the FDM scheme 400 may implement or be implemented by aspects of a wireless communications system 100 and a wireless communications system 200. For example, the FDM scheme 400 may be implemented by a UE 115 or a network entity 105 as described with reference to FIGS. 1 and 2.

As described in FIG. 2, during a beam management procedure, the network entity may transmit a set of SSBs 405 (e.g., an SSB 405-*a*, an SSB 405-*b*, an SSB 405-*c*, an SSB 405-*d*, an SSB 405-*e*, an SSB 405-*f*, an SSB 405-*g*, and an SSB 405-*h*) to the UE using a set of directional transmit beams. In some examples, the network entity may transmit a first subset of the set of SSBs 405 via a first antenna port corresponding to a polarization 410-*a* (e.g., a horizontal polarization) and a second subset of the set of SSBs 405 via a second antenna port corresponding to a polarization 410-*b* (e.g., a vertical polarization).

In the example of FIG. 4, the network entity may arrange the set of SSBs 405 according to the FDM scheme 400. That is, each SSB 405 may occupy different frequency resources, but may occupy the same or overlapping time resources as another SSB in the set. According to a first FDM scheme, the network entity may interleave the first subset of the set of SSBs 405 (e.g., transmitted via polarization 410-*a*) with the second subset of the set of SSBs 405 (e.g., transmitted via polarization 410-*a*) in frequency. In such example, the first subset of the set of SSBs 405 may include the SSB 405-*a*, the SSB 405-*c*, the SSB 405-*e*, and the SSB 405-*g* and the second subset of the set of SSBs 405 may include the SSB 405-*b*, the SSB 405-*d*, the SSB 405-*f*, and the SSB 405-*h*. The first subset of SSBs 405 may occupy a first set of frequency resources and the second subset of SSBs 405 may occupy a second set of frequency resources. Other FDM schemes in which SSBs 405 of the set occupy different frequency resources are possible.

Further, the network entity may utilize a same directional transmit beam to transmit a pair of SSBs 405. An SSB pair may include an SSB 405 of the first subset and an SSB 405 of the second subset. For the first FDM scheme, the SSB pair may include an SSB 405 of the first subset and an SSB of the second subset that occupies the same or overlapping time resources as the SSB 405 of the first subset. For example. a first SSB pair may include the SSB 405-*a* and the SSB 405-*b*. A second SSB pair may include the SSB 405-*c* and the SSB 405-*d*. A third SSB pair may include the SSB 405-*e* and the SSB 405-*f*. A fourth SSB pair may include the SSB 405-*g* and the SSB 405-*h*. The network entity may transmit the first SSB pair using a first directional transmit beam, the second SSB pair using a second directional transmit beam, the third SSB pair using a third directional transmit beam, and the fourth SSB pair using a fourth directional beam.

In the end, the UE may receive one SSB for each type of polarization and each directional transmit beam of the set. As one example, the polarization types may include two different types of polarization (e.g., polarization 410-*a* and polarization 410-*b*) and the set of directional transmit beams may include 20 beams. In such example, the set of SSBs 405 may include 40 SSBs.

Additionally, the UE may receive each SSB pair using a same directional receive beam 415. As described above, a pair of SSB may include an SSB 405 of the first subset and an SSB 405 of the second subset that are transmitted using a same directional transmit beam of the network entity. For the first FDM scheme, the first SSB pair may include the SSB 405-*a* and the SSB 405-*b*. As such, the UE may receive the SSB 405-*a* and the SSB 405-*b* using a same directional receive beam 415.

Further, the network entity may generate the set of SSBs 405 by applying a respective precoder to the set of SSBs 405. In some examples, the network entity may apply a first precoder to the first subset of SSBs 405 and a second precoder to the second subset of SSBs 405. A combination of the first precoder and the second precoder may be a rank 2. The UE may confirm that the combination of the first precoder and the second precoder is a rank 2 precoder if a result of performing decomposition (e.g., SVD) on the received signal (e.g., the SSB pair) is a matrix including two non-zero eigenvalues. An example of the first precoder may be [1;0] and the corresponding second precoder may be [0;1]. In such example, the combination of the first precoder and the second precoder may be [10;01].

Figure 5:
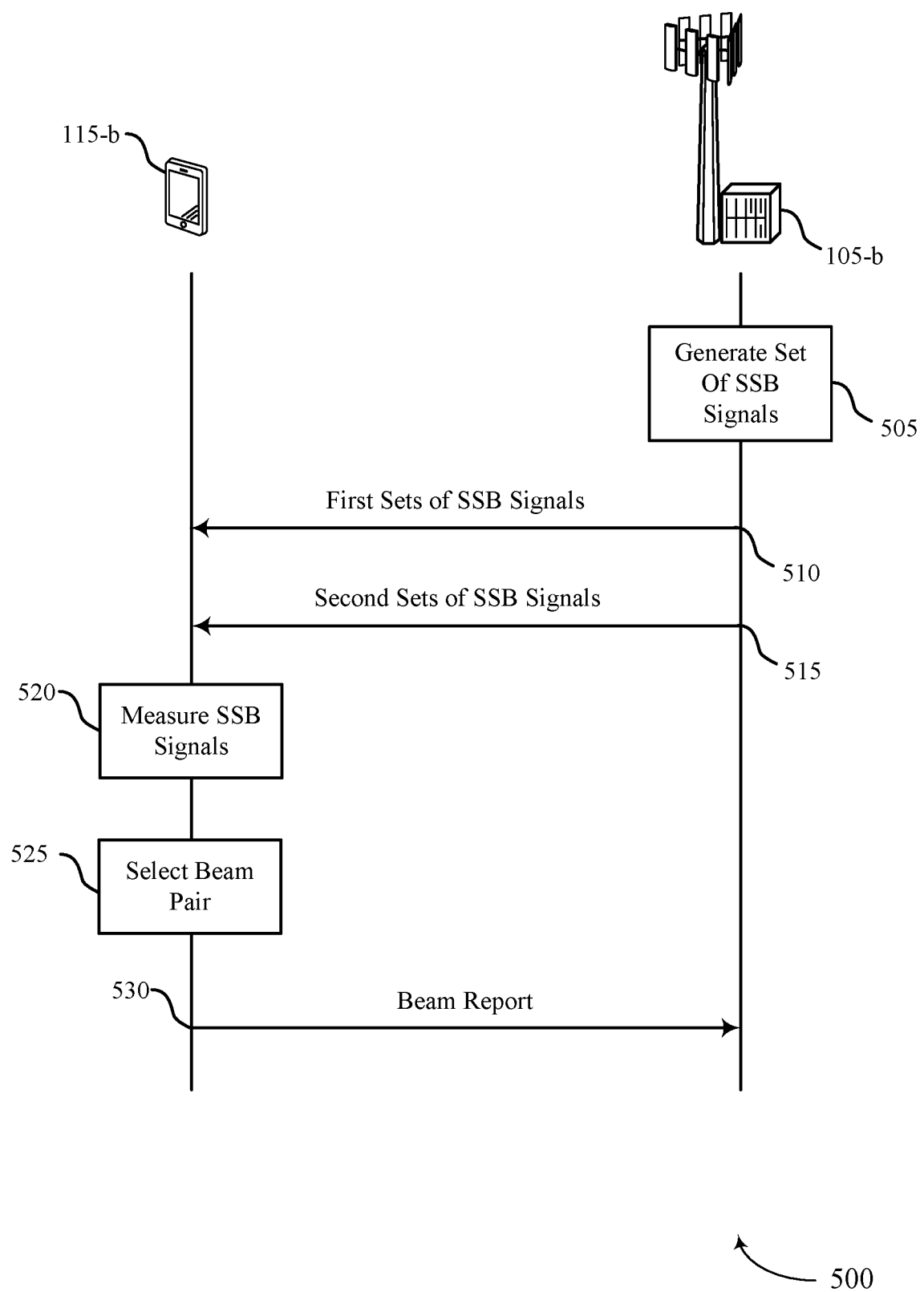
FIG. 5 illustrates an example of a process flow that supports beam management using enhanced SSB signaling in accordance with one or more aspects of the present disclosure.

FIG. 5 illustrates an example of a process flow 500 that supports beam management using enhanced SSB signaling in accordance with one or more aspects of the present disclosure. In some examples, the process flow 500 may implement or be implemented by aspects of a wireless communications system 100 and a wireless communications system 200. For example, the process flow 500 may be implemented by a UE 115-b or a network entity 105-b which may be examples of a UE 115 and a network entity 105 as described with reference to FIGS. 1 and 2. Alternative examples of the following may be implemented, where some steps are performed in a different order than described or are not performed at all. In some cases, steps may include additional features not mentioned below, or further steps may be added.

At 505, the network entity 105-b may generate multiple sets of SSB signals. The multiple sets of SSB signal may include first sets of SSB signals and second sets of SSB signals. In some examples, the network entity 105-b may generate the multiple sets of SSB signals by applying a precoder. For example, the network entity 105-b may generate the first sets of SSB signals by applying a first precoder and generate the second sets of SSB signals by applying a second precoder. In some examples, a combination of the first precoder and the second precoder may include a rank 2 precoder.

At 510, the network entity 105-b may transmit the first sets of SSB signals to the UE 115-b. In some examples, the network entity 105-b may transmit the first sets of SSB signals via a first antenna port corresponding to a first polarization. Each set of SSB signals in the first sets of SSB signals may be transmitted using a different directional beam of a set of direction beams.

At 515, the network entity 105-b may transmit the second sets of SSB signals to the UE 115-b. In some examples, the network entity 105-b may transmit the second sets of SSB signals via a second antenna port corresponding to a second polarization. Each set of SSB signals in the second sets of SSB signals may be transmitted using a different directional beam of the set of direction beams. The first polarization and the second polarization may include vertical polarization or horizontal polarization. Additionally, the first polarization may be different from the second polarization.

In some examples, the network entity 105-b may transmit the multiple sets of SSB signals according to a TDM scheme. In such example, the network entity 105-b may transmit the first sets of SSB signals using a first set of time resources and the second sets of SSB signals using a second set of time resources that is different from the first set of time resources. Additionally, the first sets of SSB signals may interleave the second sets of SSB signals in time. The network entity 105-b may transmit a second set of SSB signals of the second sets of SSBs signals subsequent to transmitting a first set of SSB signals of the first sets of SSBs signals and prior to transmitting a different first set of SSB signals of the first sets of SSB signals.

Alternatively, the network entity 105-b may transmit the multiple sets of SSB signals according to an FDM scheme. In such example, the network entity 105-b may transmit the first sets of SSB signals using a first set of frequency resources and the second set of SSB signals using a second set of frequency resources different from the first set of frequency resources. Additionally, the first sets of SSB signals may interleave the second sets of SSB signals in frequency. The network entity 105-b may transmit a first set of SSB signals of the first sets of SSB signals using a first set of time resources and a first set of frequency resources and transmit a second set of SSB signals of the second sets of SSB signals using a second set of time resources and a second set of frequency resources. The first set of time resources may at least partially overlap the second set of time resources. Additionally, the first set of frequency resource may be different from the second set of frequency resources.

In some examples, the network entity 105-b may transmit a first set of SSB signals of the first sets of SSB signals and a second set of SSB signals of the second sets of SSB signals using a same directional beam of the set of directional beams. In the end, the network entity may transmit at least one first set of SSB signals and at least one second set of SSB signals for each directional beam of the set of directional beams. Sets of SSB signals transmitted using a same directional beam may be known as an SSB pair.

At 520, the UE 115-b may receive the multiple sets of SSB signals and measure a signal strength (e.g., an RSRP value) of the multiple sets of SSB signals. In some examples, the UE 115-b may measure the signal strength of each SSB pair. Additionally, the UE 115-b may utilize a same directional beam to receive each of the set of SSB signals of the SSB pair.

At 525, the UE 115-b may select a beam pair. A beam pair may include a transmit beam used by the network entity 105-b and a receive beam used by the UE 115-b. In some examples, the UE 115-b may select the beam pair that corresponds to an SSB beam pair that has the highest measured signal strength.

At 530, the UE 115-b may transmit a beam report to the network entity 105-b. In some examples, the beam report may include an indication of the selected beam pair. For example, the beam report may include one or more beam identifiers (IDs) indicative of the selected beam pair.

Figure 6:
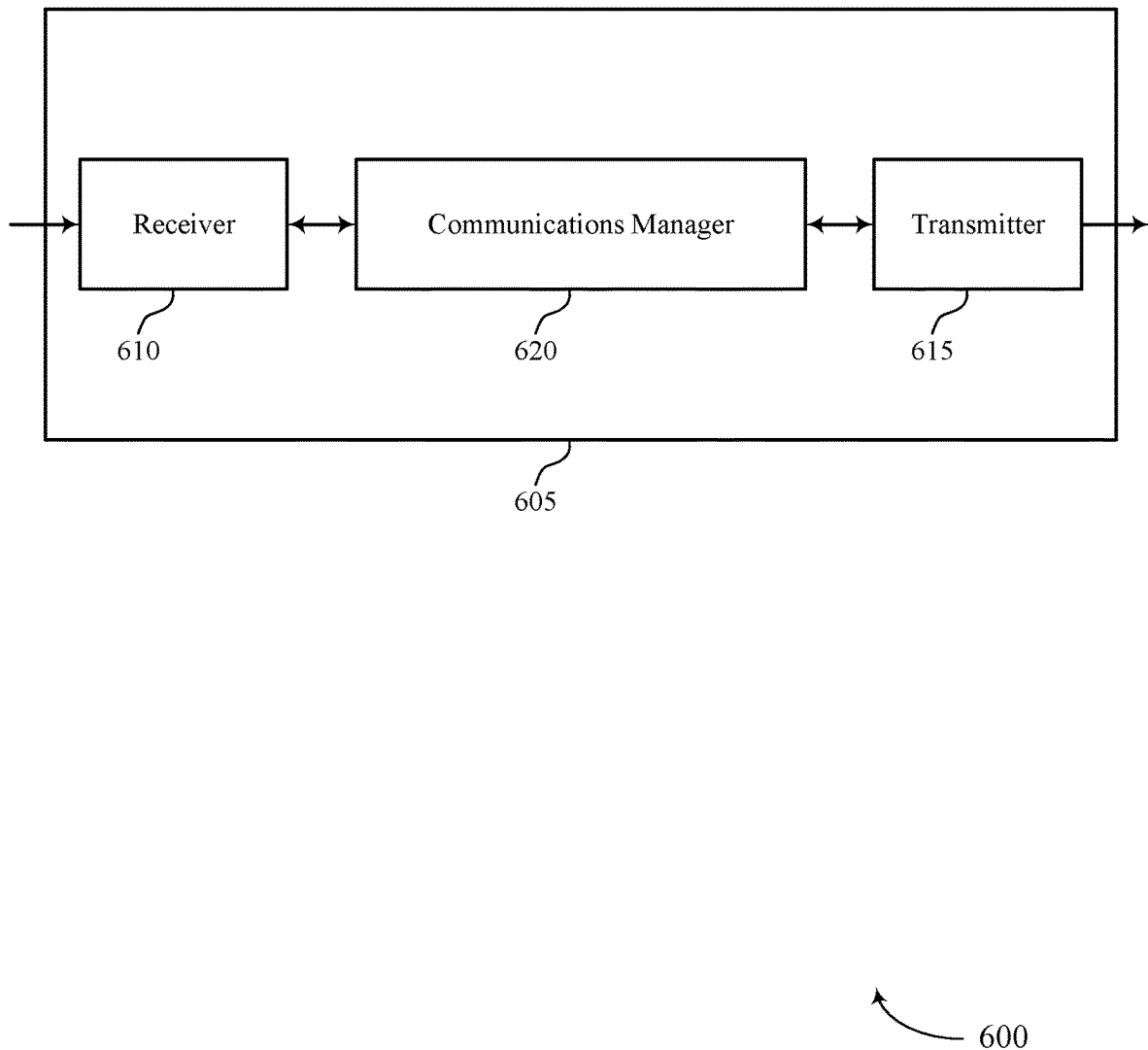
FIGS. 6 and 7 show block diagrams of devices that support beam management using enhanced SSB signaling in accordance with one or more aspects of the present disclosure.

FIG. 6 shows a block diagram 600 of a device 605 that supports beam management using enhanced SSB signaling in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam management using enhanced SSB signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam management using enhanced SSB signaling). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam management using enhanced SSB signaling as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first set of multiple sets of SSB signals from a network entity, where the first set of multiple sets of SSB signals are associated with a first antenna port of the network entity corresponding to a first polarization and are associated with respective directional beams of a set of directional beams. The communications manager 620 may be configured as or otherwise support a means for receiving a second set of multiple sets of SSB signals from the network entity, where the second set of multiple sets of SSB signals are associated with a second antenna port of the network entity corresponding to a second polarization and are associated with respective directional beams of the set of directional beams. The communications manager 620 may be configured as or otherwise support a means for transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing.

Figure 7:
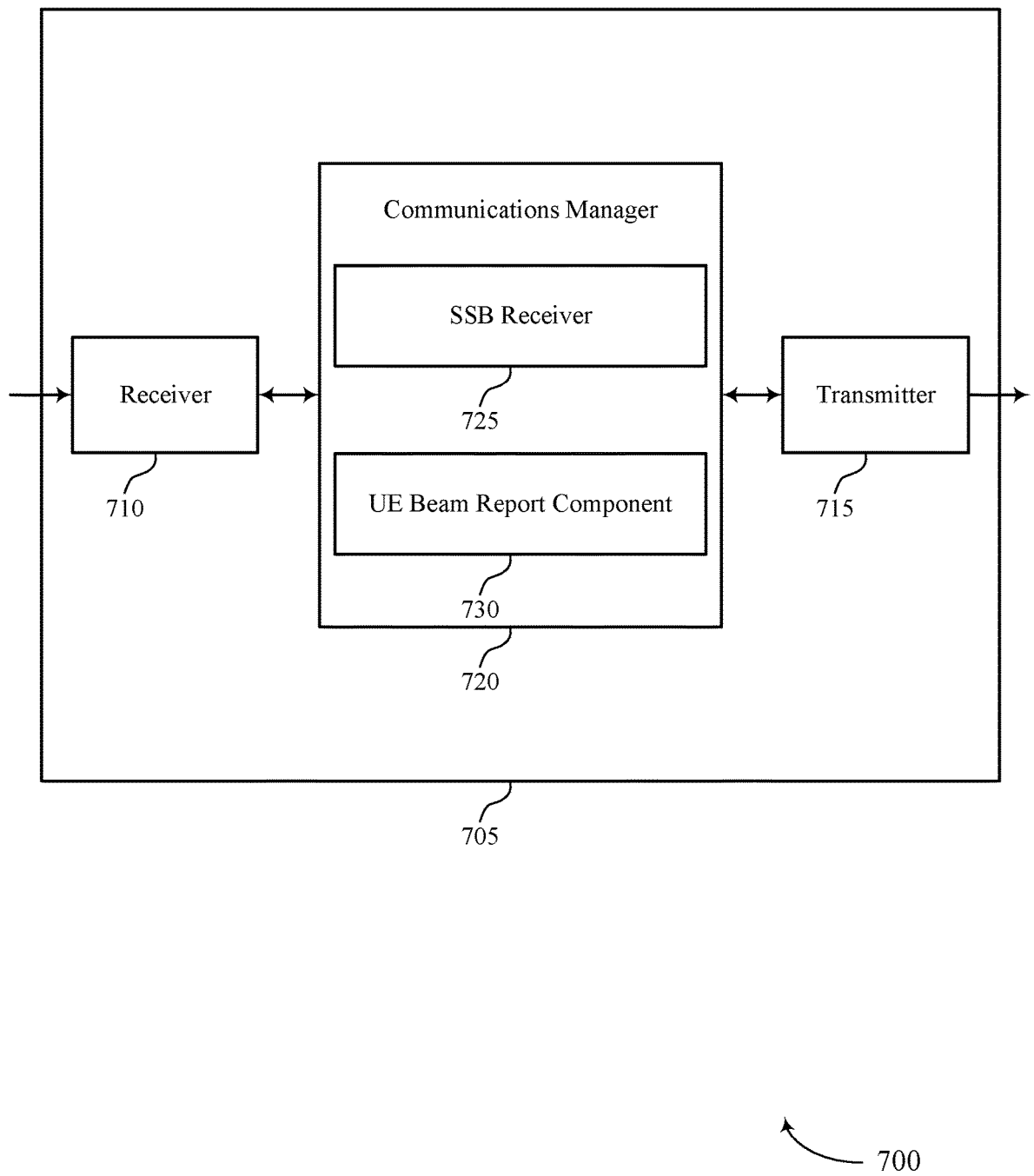

FIG. 7 shows a block diagram 700 of a device 705 that supports beam management using enhanced SSB signaling in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam management using enhanced SSB signaling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam management using enhanced SSB signaling). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam management using enhanced SSB signaling as described herein. For example, the communications manager 720 may include an SSB receiver 725 a UE beam report component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The SSB receiver 725 may be configured as or otherwise support a means for receiving a first set of multiple sets of SSB signals from a network entity, where the first set of multiple sets of SSB signals are associated with a first antenna port of the network entity corresponding to a first polarization and are associated with respective directional beams of a set of directional beams. The SSB receiver 725 may be configured as or otherwise support a means for receiving a second set of multiple sets of SSB signals from the network entity, where the second set of multiple sets of SSB signals are associated with a second antenna port of the network entity corresponding to a second polarization and are associated with respective directional beams of the set of directional beams. The UE beam report component 730 may be configured as or otherwise support a means for transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

Figure 8:
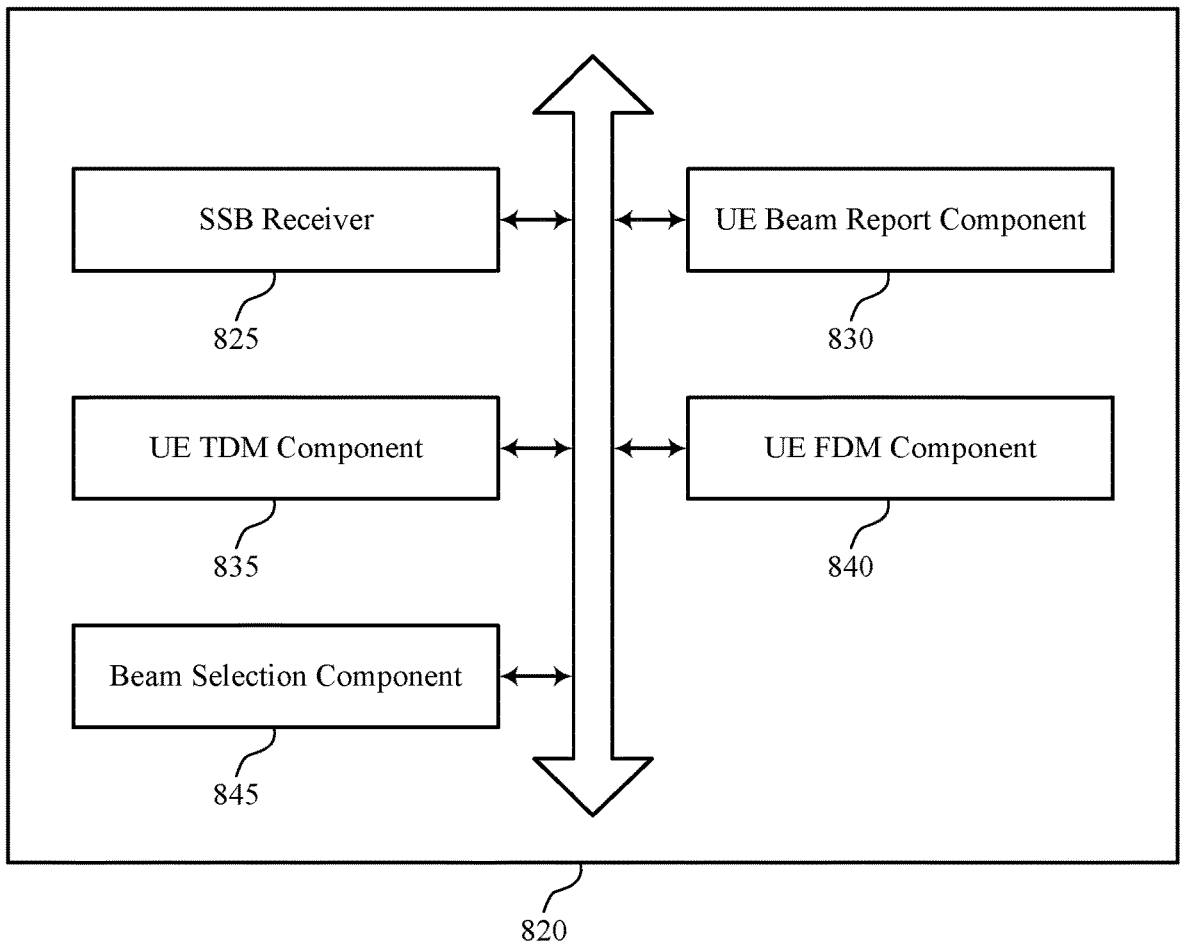
FIG. 8 shows a block diagram of a communications manager that supports beam management using enhanced SSB signaling in accordance with one or more aspects of the present disclosure.

FIG. 8 shows a block diagram 800 of a communications manager 820 that supports beam management using enhanced SSB signaling in accordance with one or more aspects of the present disclosure. The communications manager 820 may be an example of aspects of a communications manager 620, a communications manager 720, or both, as described herein. The communications manager 820, or various components thereof, may be an example of means for performing various aspects of beam management using enhanced SSB signaling as described herein. For example, the communications manager 820 may include an SSB receiver 825, a UE beam report component 830, a UE TDM component 835, a UE FDM component 840, a beam selection component 845, or any combination thereof. Each of these components may communicate, directly or indirectly, with one another (e.g., via one or more buses).

The communications manager 820 may support wireless communication at a UE in accordance with examples as disclosed herein. The SSB receiver 825 may be configured as or otherwise support a means for receiving a first set of multiple sets of SSB signals from a network entity, where the first set of multiple sets of SSB signals are associated with a first antenna port of the network entity corresponding to a first polarization and are associated with respective directional beams of a set of directional beams. In some examples, the SSB receiver 825 may be configured as or otherwise support a means for receiving a second set of multiple sets of SSB signals from the network entity, where the second set of multiple sets of SSB signals are associated with a second antenna port of the network entity corresponding to a second polarization and are associated with respective directional beams of the set of directional beams. The UE beam report component 830 may be configured as or otherwise support a means for transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

In some examples, receiving the first set of multiple sets of SSB signals includes receiving the first set of multiple sets of SSB signals using a first set of time resources. In some examples, receiving the second set of multiple sets of SSB signals includes receiving the second set of multiple sets of SSB signals using a second set of time resources, where the first set of time resources is different from the second set of time resources.

In some examples, receiving the first set of multiple sets of SSB signals includes receiving the first set of multiple sets of SSB signals using a first set of frequency resources. In some examples, receiving the second set of multiple sets of SSB signals includes receiving the second set of multiple sets of SSB signals using a second set of frequency resources, where the first set of frequency resources is different from the second set of frequency resources.

In some examples, receiving the first set of multiple sets of SSB signals includes using a first receive beam to receive a first set of SSB signals associated with a first transmit beam of the network entity, the first transmit beam included in the set of directional beams. In some examples, receiving the second set of multiple sets of SSB signals includes using the first receive beam to receive a second set of SSB signals associated with the first transmit beam of the network entity.

In some examples, to support receiving the second set of multiple sets of SSB signals, the UE TDM component 835 may be configured as or otherwise support a means for receiving, after receiving a first set of SSB signals included in the first set of multiple sets and prior to receiving a second set of SSB signals included in the first set of multiple sets, a third set of SSB signals included in the second set of multiple sets, where the third set of SSB signals is associated with a same directional beam of the set of directional beams as the first set of SSB signals.

In some examples, to support receiving the second set of multiple sets of SSB signals, the UE FDM component 840 may be configured as or otherwise support a means for receiving, via a first set of time resources that at least partially overlaps with a second set of time resources used to receive a first set of SSB signals included in the first set of multiple sets, a second set of SSB signals included in the second set of multiple sets.

In some examples, a first set of frequency resources used to receive the first set of SSB signals is different from a second set of frequency resources used to receive the second set of SSB signals.

In some examples, the beam selection component 845 may be configured as or otherwise support a means for selecting the beam pair based on measurements of the first set of multiple sets of SSB signals and measurements of the second set of multiple sets of SSB signals.

In some examples, one of the first polarization and the second polarization includes a vertical polarization. In some examples, another of the first polarization and the second polarization includes a horizontal polarization.

Figure 9:
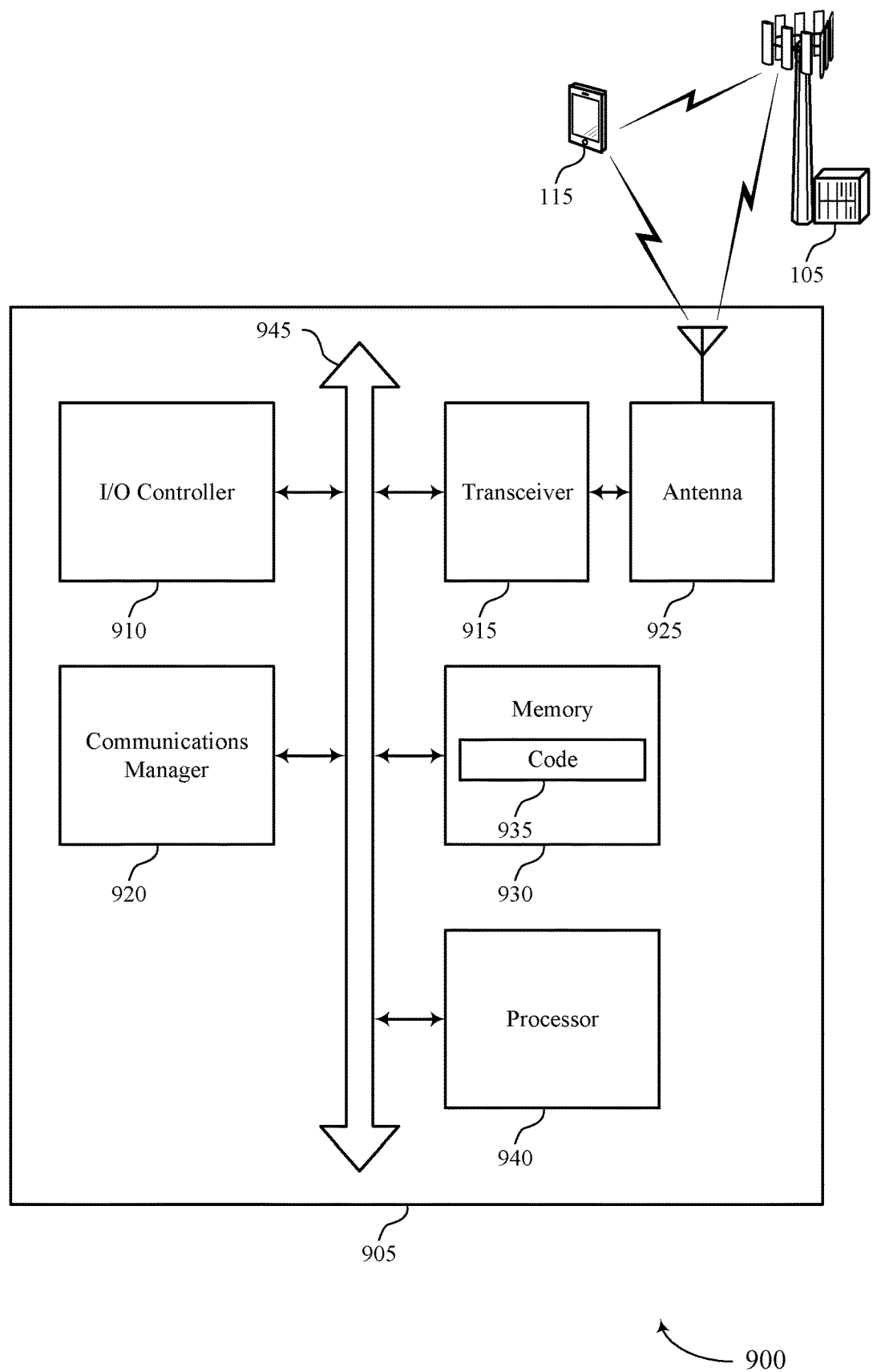
FIG. 9 shows a diagram of a system including a device that supports beam management using enhanced SSB signaling in accordance with one or more aspects of the present disclosure.

FIG. 9 shows a diagram of a system 900 including a device 905 that supports beam management using enhanced SSB signaling in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam management using enhanced SSB signaling). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first set of multiple sets of SSB signals from a network entity, where the first set of multiple sets of SSB signals are associated with a first antenna port of the network entity corresponding to a first polarization and are associated with respective directional beams of a set of directional beams. The communications manager 920 may be configured as or otherwise support a means for receiving a second set of multiple sets of SSB signals from the network entity, where the second set of multiple sets of SSB signals are associated with a second antenna port of the network entity corresponding to a second polarization and are associated with respective directional beams of the set of directional beams. The communications manager 920 may be configured as or otherwise support a means for transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization.

By including or configuring the communications manager 920 in accordance with examples as described herein, the device 905 may support techniques for improved communication reliability, improved user experience related to reduced processing, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam management using enhanced SSB signaling as described herein, or the processor 940 and the memory 930 may be otherwise configured to perform or support such operations.

Figure 10:
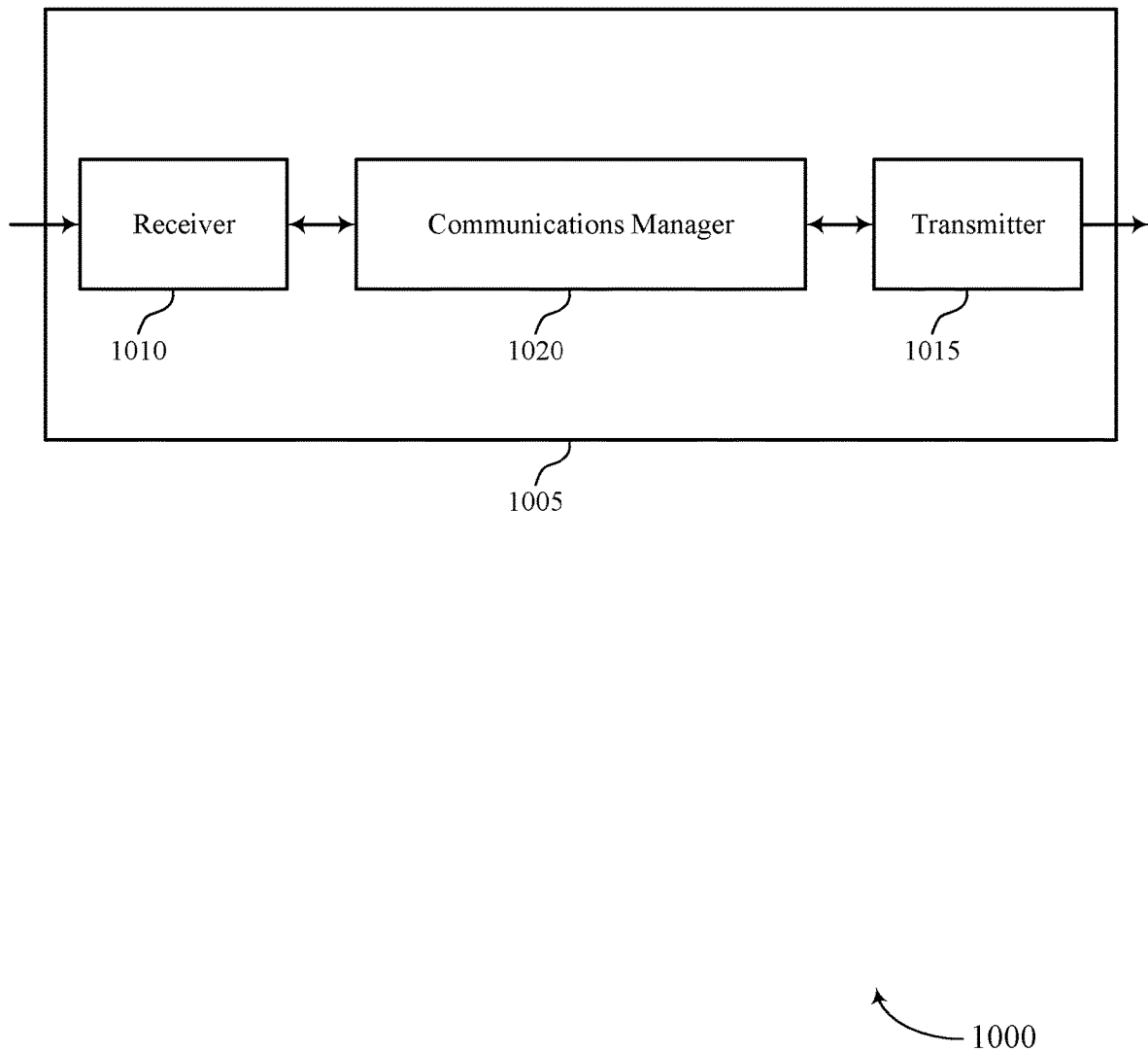
FIGS. 10 and 11 show block diagrams of devices that support beam management using enhanced SSB signaling in accordance with one or more aspects of the present disclosure.

FIG. 10 shows a block diagram 1000 of a device 1005 that supports beam management using enhanced SSB signaling in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of beam management using enhanced SSB signaling as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a first set of multiple sets of SSB signals via a first antenna port corresponding to a first polarization, where the first set of multiple sets of SSB signals are transmitted using respective directional beams of a set of directional beams. The communications manager 1020 may be configured as or otherwise support a means for transmitting a second set of multiple sets of SSB signals via a second antenna port corresponding to a second polarization, where the second set of multiple sets of SSB signals are transmitted using respective directional beams of the set of directional beams. The communications manager 1020 may be configured as or otherwise support a means for receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing.

Figure 11:
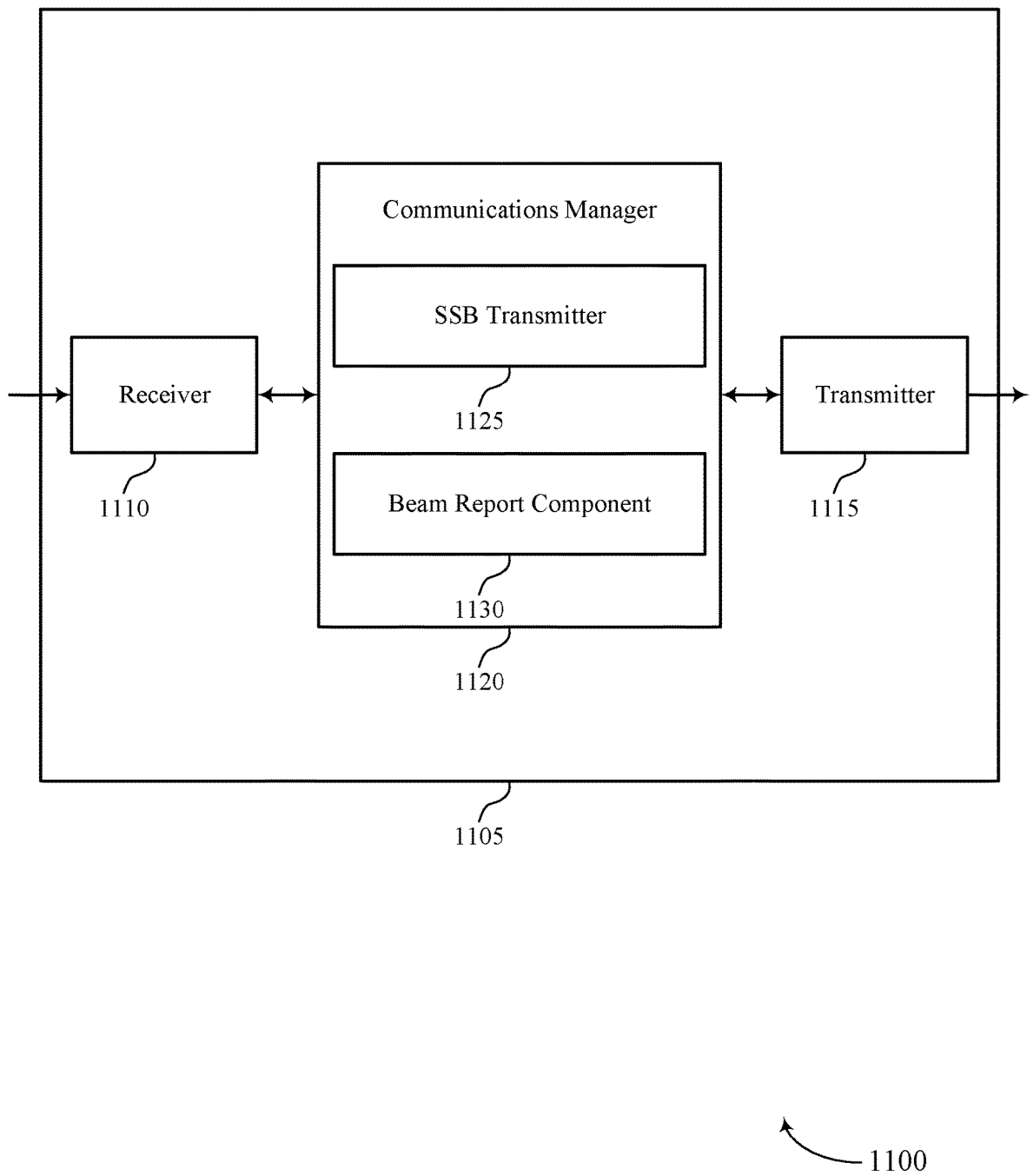

FIG. 11 shows a block diagram 1100 of a device 1105 that supports beam management using enhanced SSB signaling in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of beam management using enhanced SSB signaling as described herein. For example, the communications manager 1120 may include an SSB transmitter 1125 a beam report component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The SSB transmitter 1125 may be configured as or otherwise support a means for transmitting a first set of multiple sets of SSB signals via a first antenna port corresponding to a first polarization, where the first set of multiple sets of SSB signals are transmitted using respective directional beams of a set of directional beams. The SSB transmitter 1125 may be configured as or otherwise support a means for transmitting a second set of multiple sets of SSB signals via a second antenna port corresponding to a second polarization, where the second set of multiple sets of SSB signals are transmitted using respective directional beams of the set of directional beams. The beam report component 1130 may be configured as or otherwise support a means for receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

Figure 12:
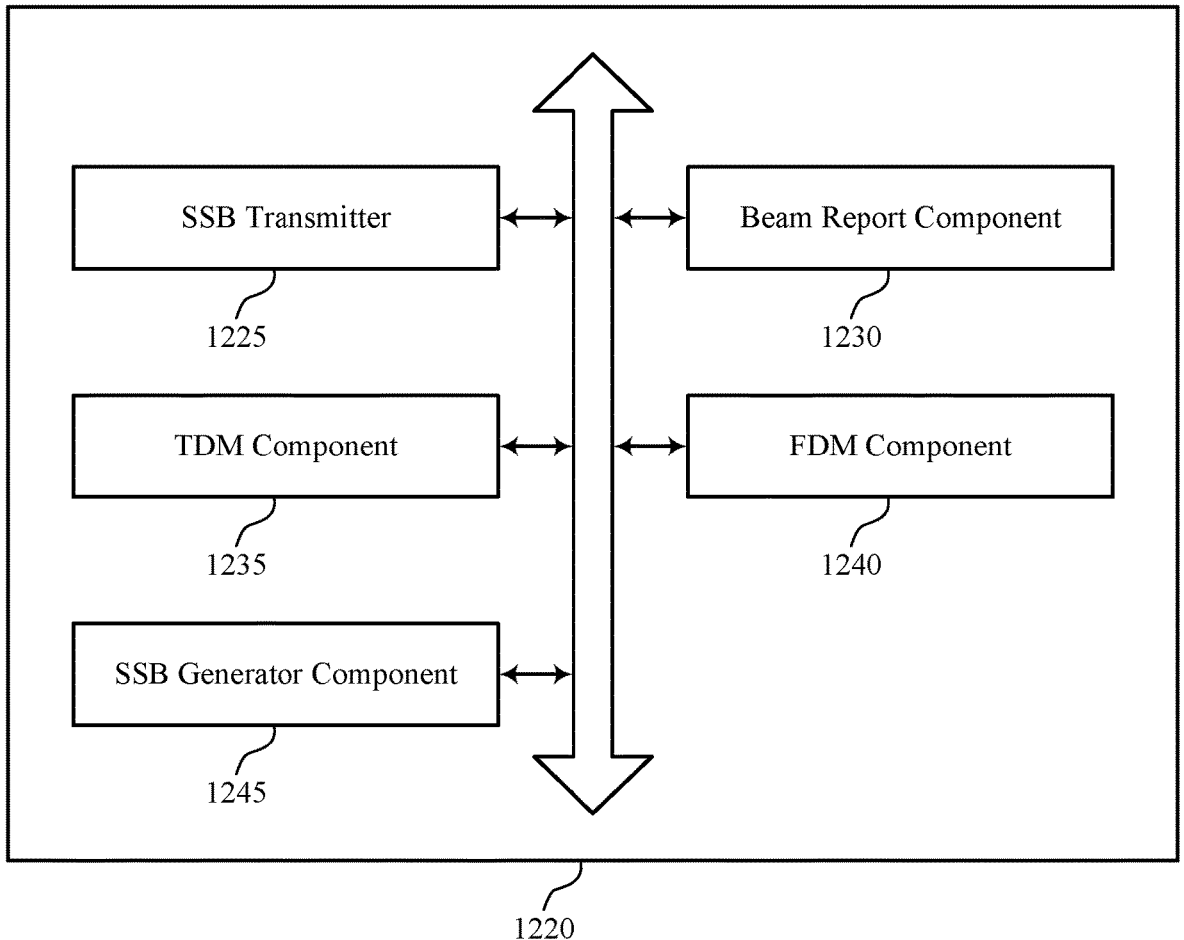
FIG. 12 shows a block diagram of a communications manager that supports beam management using enhanced SSB signaling in accordance with one or more aspects of the present disclosure.

FIG. 12 shows a block diagram 1200 of a communications manager 1220 that supports beam management using enhanced SSB signaling in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of beam management using enhanced SSB signaling as described herein. For example, the communications manager 1220 may include an SSB transmitter 1225, a beam report component 1230, a TDM component 1235, an FDM component 1240, an SSB generator component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The SSB transmitter 1225 may be configured as or otherwise support a means for transmitting a first set of multiple sets of SSB signals via a first antenna port corresponding to a first polarization, where the first set of multiple sets of SSB signals are transmitted using respective directional beams of a set of directional beams. In some examples, the SSB transmitter 1225 may be configured as or otherwise support a means for transmitting a second set of multiple sets of SSB signals via a second antenna port corresponding to a second polarization, where the second set of multiple sets of SSB signals are transmitted using respective directional beams of the set of directional beams. The beam report component 1230 may be configured as or otherwise support a means for receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

In some examples, transmitting the first set of multiple sets of SSBs includes transmitting the first set of multiple sets of SSB signals using a first set of time resources. In some examples, transmitting the second set of multiple sets of SSB signals includes transmitting the second set of multiple sets of SSB signals using a second set of time resources, where the first set of time resources is different from the second set of time resources.

In some examples, transmitting the first set of multiple sets of SSB signals includes transmitting the first set of multiple sets of SSB signals using a first set of frequency resources. In some examples, transmitting the second set of multiple sets of SSB signals includes transmitting the second set of multiple sets of SSB signals using a second set of frequency resources, where the first set of frequency resources is different from the second set of frequency resources.

In some examples, transmitting the first set of multiple sets of SSB signals includes transmitting a first set of SSB signals via the first antenna port using a first transmit beam of the set of directional beams the first transmit beam included in the set of directional beams. In some examples, transmitting the second set of multiple sets of SSB signals includes transmitting a second set of SSB signals via the second antenna port using the first transmit beam.

In some examples, to support transmitting the second set of multiple sets of SSB signals, the TDM component 1235 may be configured as or otherwise support a means for transmitting, after transmitting a first set of SSB signals included in the first set of multiple sets and prior to transmitting a second set of SSB signals included in the first set of multiple sets, a third set of SSB signals included in the second set of multiple sets, where the third set of SSB signals is transmitted using a same directional beam of the set of directional beams as the first set of SSB signals.

In some examples, to support transmitting the second set of multiple sets of SSB signals, the FDM component 1240 may be configured as or otherwise support a means for transmitting, via a first set of time resources that at least partially overlaps with a second set of time resources used to transmit a first set of SSB signals included in the first set of multiple sets, a second set of SSB signals included in the second set of multiple sets.

In some examples, a first set of frequency resources used to transmit the first set of SSB signals is different from a second set of frequency resources used to transmit the second set of SSB signals.

In some examples, the SSB generator component 1245 may be configured as or otherwise support a means for generating the first set of multiple sets of SSB signals based on a first precoding matrix. In some examples, the SSB generator component 1245 may be configured as or otherwise support a means for generating the second set of multiple sets of SSB signals based on a second precoding matrix, where a combination of the first precoding matrix and the second precoding matrix includes a rank-2 precoding matrix.

In some examples, one of the first polarization and the second polarization includes a vertical polarization. In some examples, another of the first polarization and the second polarization includes a horizontal polarization.

Figure 13:
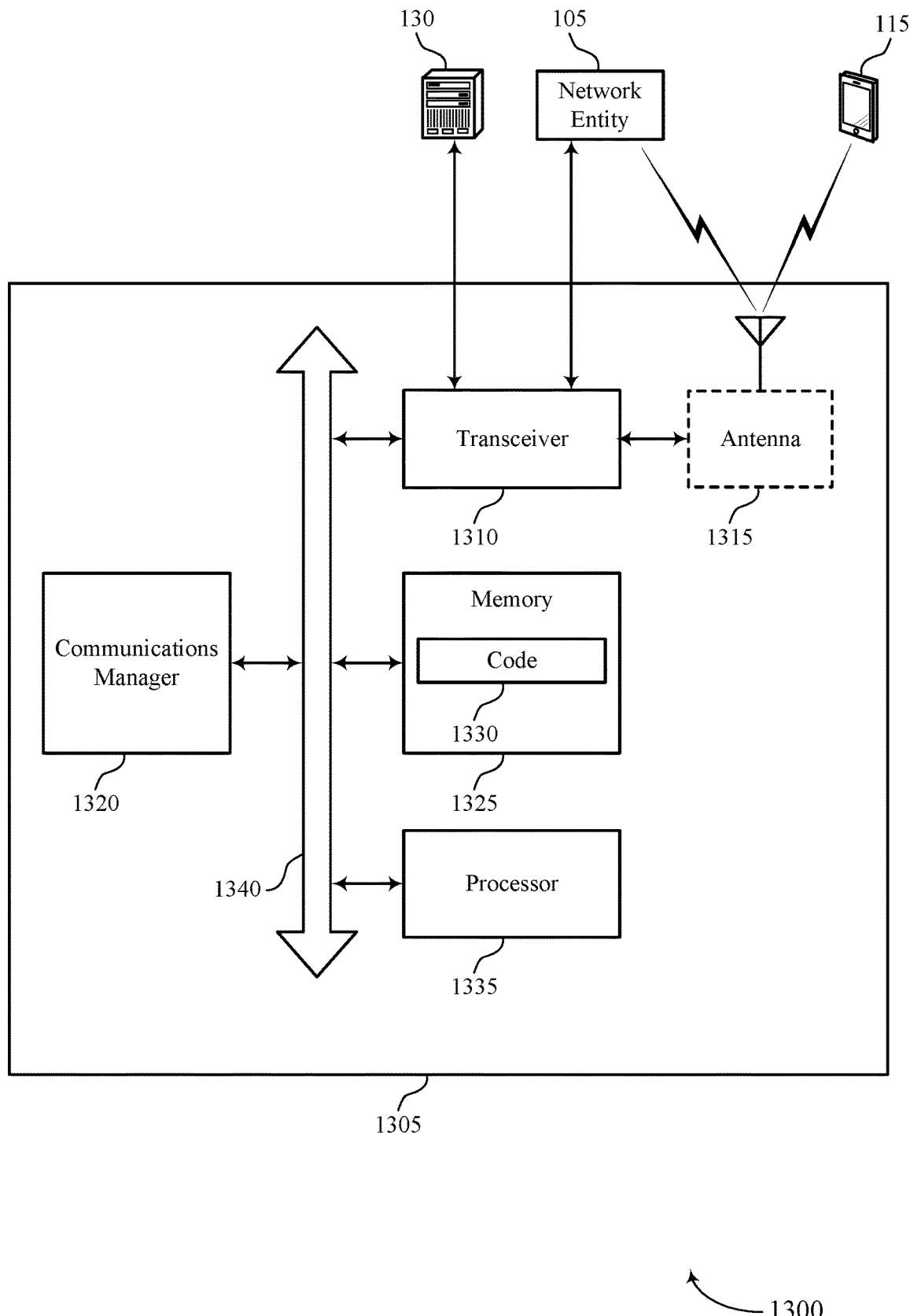
FIG. 13 shows a diagram of a system including a device that supports beam management using enhanced SSB signaling in accordance with one or more aspects of the present disclosure.

FIG. 13 shows a diagram of a system 1300 including a device 1305 that supports beam management using enhanced SSB signaling in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting beam management using enhanced SSB signaling). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305 and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105 and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a first set of multiple sets of SSB signals via a first antenna port corresponding to a first polarization, where the first set of multiple sets of SSB signals are transmitted using respective directional beams of a set of directional beams. The communications manager 1320 may be configured as or otherwise support a means for transmitting a second set of multiple sets of SSB signals via a second antenna port corresponding to a second polarization, where the second set of multiple sets of SSB signals are transmitted using respective directional beams of the set of directional beams. The communications manager 1320 may be configured as or otherwise support a means for receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization.

By including or configuring the communications manager 1320 in accordance with examples as described herein, the device 1305 may support techniques for improved communication reliability, improved user experience related to reduced processing, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. For example, the communications manager 1320 may be configured to receive or transmit messages or other signaling as described herein via the transceiver 1310. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of beam management using enhanced SSB signaling as described herein, or the processor 1335 and the memory 1325 may be otherwise configured to perform or support such operations.

Figure 14:
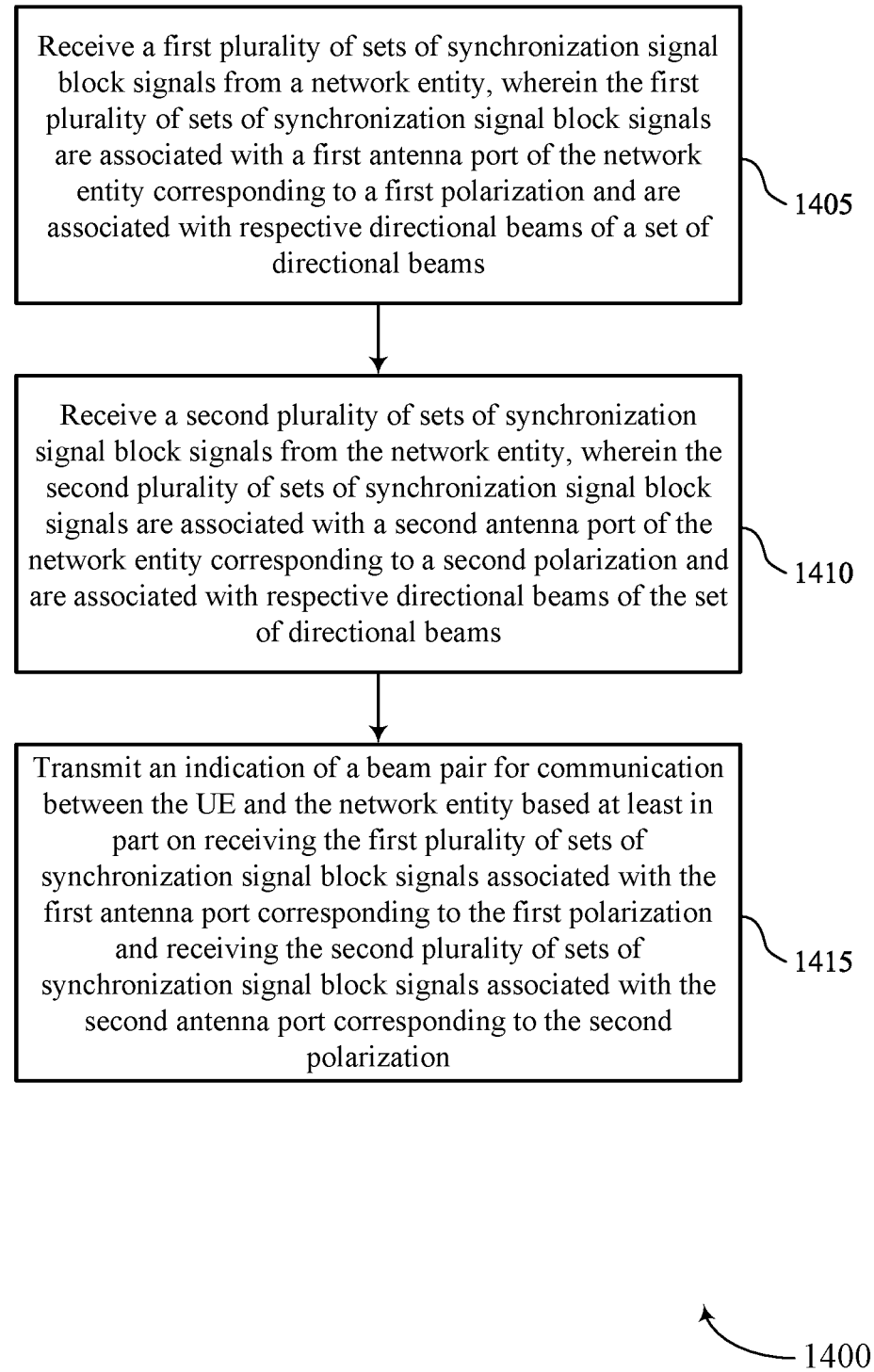
FIGS. 14 through 19 show flowcharts illustrating methods that support beam management using enhanced SSB signaling in accordance with one or more aspects of the present disclosure.

FIG. 14 shows a flowchart illustrating a method 1400 that supports beam management using enhanced SSB signaling in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first set of multiple sets of SSB signals from a network entity, where the first set of multiple sets of SSB signals are associated with a first antenna port of the network entity corresponding to a first polarization and are associated with respective directional beams of a set of directional beams (e.g., each set of SSB signals in the first plurality of SSB signal sets may be received using a different directional beam of the set of directional beams). The operations of 1405 may be performed in accordance with examples as disclosed herein. In some examples, aspects of the operations of 1405 may be performed by an SSB receiver 825 as described with reference to FIG. 8. Additionally or alternatively, means for performing 1405 may, but not necessarily, include, for example, antenna 925, transceiver 915, communications manager 920, memory 930 (including code 935), processor 940 and/or bus 945.

At 1410, the method may include receiving a second set of multiple sets of SSB signals from the network entity, where the second set of multiple sets of SSB signals are associated with a second antenna port of the network entity corresponding to a second polarization and are associated with respective directional beams of the set of directional beams (e.g., each set of SSB signals in the second plurality of SSB signal sets may be received using a different directional beam of the set of directional beams). The operations of 1410 may be performed in accordance with examples as disclosed herein. In some examples, aspects of the operations of 1410 may be performed by an SSB receiver 825 as described with reference to FIG. 8. Additionally or alternatively, means for performing 1410 may, but not necessarily, include, for example, antenna 925, transceiver 915, communications manager 920, memory 930 (including code 935), processor 940 and/or bus 945.

At 1415, the method may include transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization. The operations of 1415 may be performed in accordance with examples as disclosed herein. In some examples, aspects of the operations of 1415 may be performed by a UE beam report component 830 as described with reference to FIG. 8. Additionally or alternatively, means for performing 1415 may, but not necessarily, include, for example, antenna 925, transceiver 915, communications manager 920, memory 930 (including code 935), processor 940 and/or bus 945.

Figure 15:
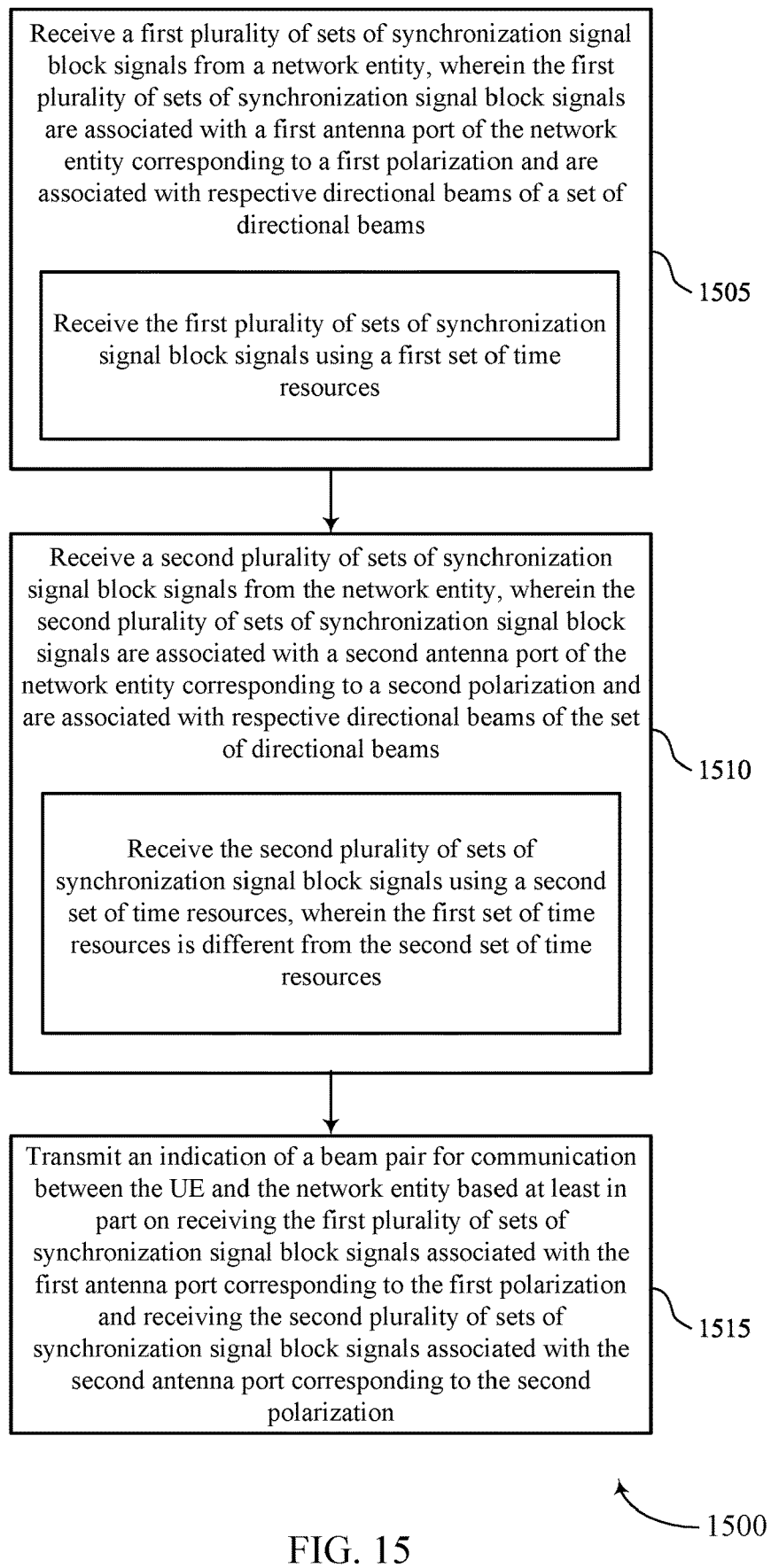

FIG. 15 shows a flowchart illustrating a method 1500 that supports beam management using enhanced SSB signaling in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first set of multiple sets of SSB signals from a network entity, where the first set of multiple sets of SSB signals are associated with a first antenna port of the network entity corresponding to a first polarization and are associated with respective directional beams of a set of directional beams (e.g., each set of SSB signals in the first plurality of SSB signal sets may be received using a different directional beam of the set of directional beams). In some examples, receiving the first set of multiple sets of SSB signals includes receiving the first set of multiple sets of SSB signals using a first set of time resources. The operations of 1505 may be performed in accordance with examples as disclosed herein. In some examples, aspects of the operations of 1505 may be performed by an SSB receiver 825 as described with reference to FIG. 8. Additionally or alternatively, means for performing 1505 may, but not necessarily, include, for example, antenna 925, transceiver 915, communications manager 920, memory 930 (including code 935), processor 940 and/or bus 945.

At 1510, the method may include receiving a second set of multiple sets of SSB signals from the network entity, where the second set of multiple sets of SSB signals are associated with a second antenna port of the network entity corresponding to a second polarization and are associated with respective directional beams of the set of directional beams (e.g., each set of SSB signals in the second plurality of SSB signal sets may be received using a different directional beam of the set of directional beams). In some examples, receiving the second set of multiple sets of SSB signals includes receiving the second set of multiple sets of SSB signals using a second set of time resources, where the first set of time resources is different from the second set of time resources. The operations of 1510 may be performed in accordance with examples as disclosed herein. In some examples, aspects of the operations of 1510 may be performed by an SSB receiver 825 as described with reference to FIG. 8. Additionally or alternatively, means for performing 1510 may, but not necessarily, include, for example, antenna 925, transceiver 915, communications manager 920, memory 930 (including code 935), processor 940 and/or bus 945.

At 1515, the method may include transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization. The operations of 1515 may be performed in accordance with examples as disclosed herein. In some examples, aspects of the operations of 1515 may be performed by a UE beam report component 830 as described with reference to FIG. 8. Additionally or alternatively, means for performing 1515 may, but not necessarily, include, for example, antenna 925, transceiver 915, communications manager 920, memory 930 (including code 935), processor 940 and/or bus 945.

Figure 16:
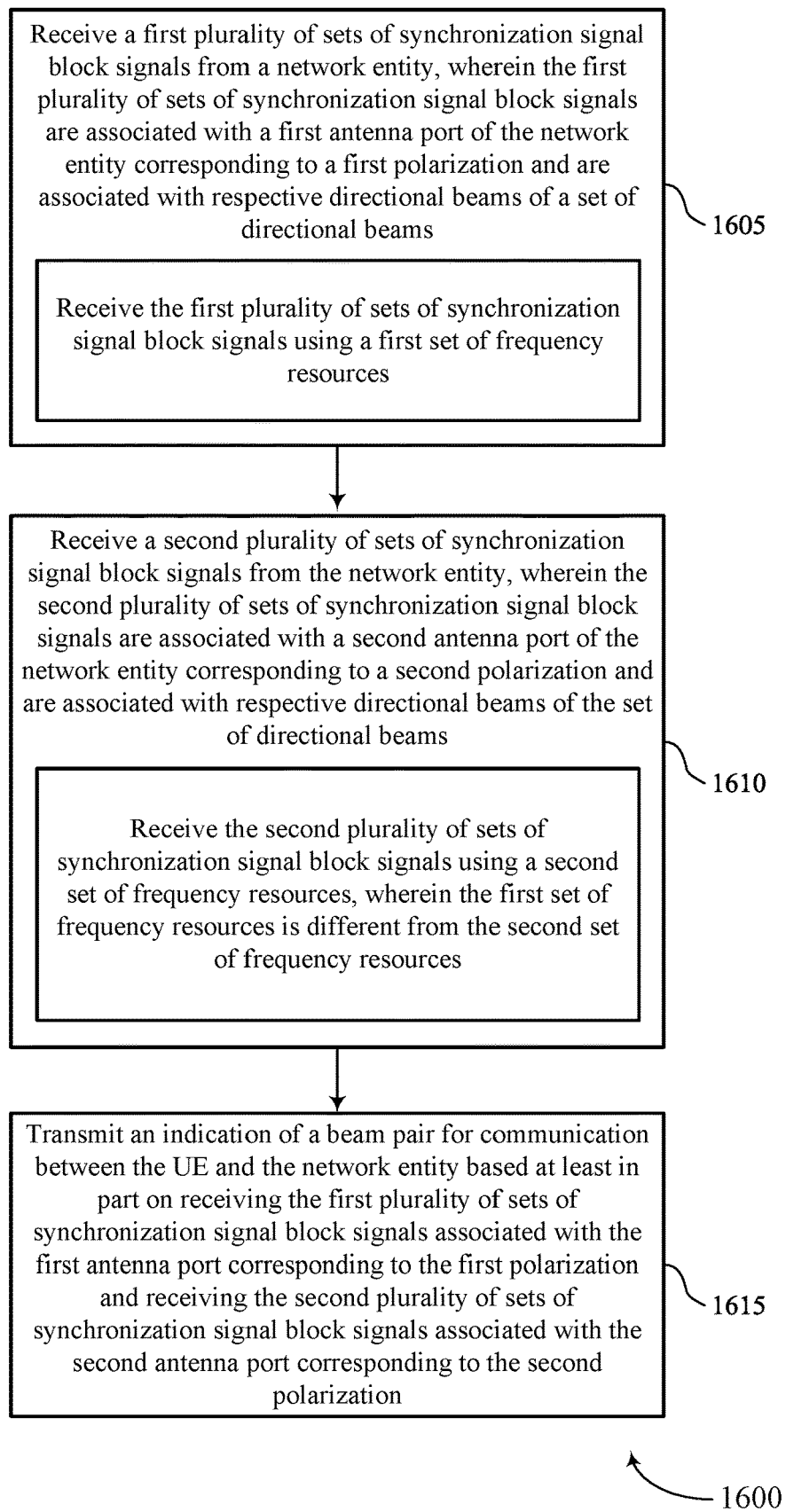

FIG. 16 shows a flowchart illustrating a method 1600 that supports beam management using enhanced SSB signaling in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first set of multiple sets of SSB signals from a network entity, where the first set of multiple sets of SSB signals are associated with a first antenna port of the network entity corresponding to a first polarization and are associated with respective directional beams of a set of directional beams (e.g., each set of SSB signals in the first plurality of SSB signal sets may be received using a different directional beam of the set of directional beams). In some examples, receiving the first set of multiple sets of SSB signals includes receiving the first set of multiple sets of SSB signals using a first set of frequency resources. The operations of 1605 may be performed in accordance with examples as disclosed herein. In some examples, aspects of the operations of 1605 may be performed by an SSB receiver 825 as described with reference to FIG. 8. Additionally or alternatively, means for performing 1605 may, but not necessarily, include, for example, antenna 925, transceiver 915, communications manager 920, memory 930 (including code 935), processor 940 and/or bus 945.

At 1610, the method may include receiving a second set of multiple sets of SSB signals from the network entity, where the second set of multiple sets of SSB signals are associated with a second antenna port of the network entity corresponding to a second polarization and are associated with respective directional beams of the set of directional beams (e.g., each set of SSB signals in the second plurality of SSB signal sets may be received using a different directional beam of the set of directional beams). In some examples, receiving the second set of multiple sets of SSB signals includes receiving the second set of multiple sets of SSB signals using a second set of frequency resources, where the first set of frequency resources is different from the second set of frequency resources. The operations of 1610 may be performed in accordance with examples as disclosed herein. In some examples, aspects of the operations of 1610 may be performed by an SSB receiver 825 as described with reference to FIG. 8. Additionally or alternatively, means for performing 1610 may, but not necessarily, include, for example, antenna 925, transceiver 915, communications manager 920, memory 930 (including code 935), processor 940 and/or bus 945.

At 1615, the method may include transmitting an indication of a beam pair for communication between the UE and the network entity based on receiving the first set of multiple sets of SSB signals associated with the first antenna port corresponding to the first polarization and receiving the second set of multiple sets of SSB signals associated with the second antenna port corresponding to the second polarization. The operations of 1615 may be performed in accordance with examples as disclosed herein. In some examples, aspects of the operations of 1615 may be performed by a UE beam report component 830 as described with reference to FIG. 8. Additionally or alternatively, means for performing 1615 may, but not necessarily, include, for example, antenna 925, transceiver 915, communications manager 920, memory 930 (including code 935), processor 940 and/or bus 945.

Figure 17:
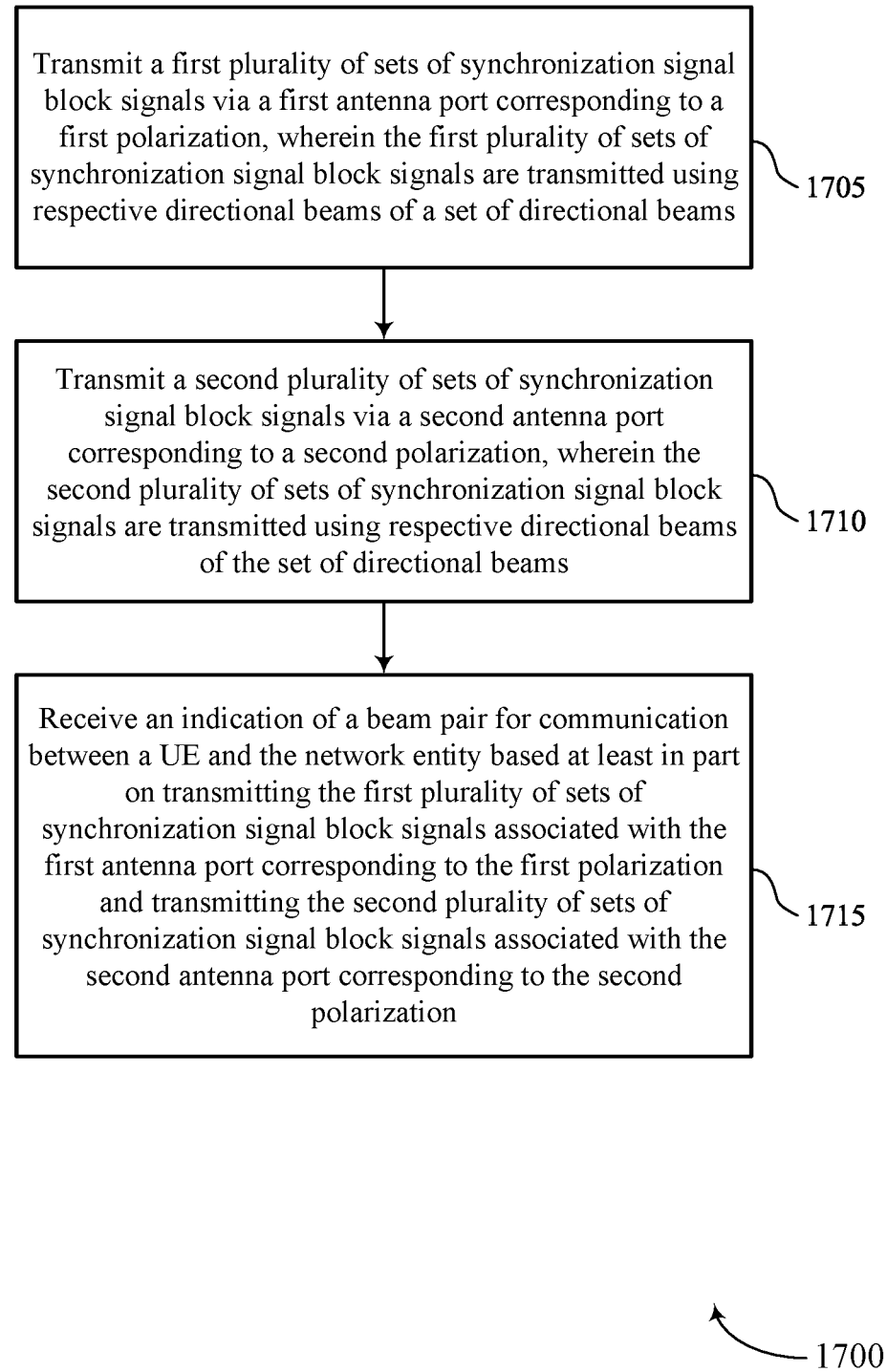

FIG. 17 shows a flowchart illustrating a method 1700 that supports beam management using enhanced SSB signaling in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first set of multiple sets of SSB signals via a first antenna port corresponding to a first polarization, where the first set of multiple sets of SSB signals are transmitted using respective directional beams of a set of directional beams (e.g., each set of SSB signals in the first plurality of SSB signal sets may be transmitted using a different directional beam of the set of directional beams). The operations of 1705 may be performed in accordance with examples as disclosed herein. In some examples, aspects of the operations of 1705 may be performed by an SSB transmitter 1225 as described with reference to FIG. 12. Additionally or alternatively, means for performing 1705 may, but not necessarily, include, for example, antenna 1315, transceiver 1310, communications manager 1320, memory 1325 (including code 1330), processor 1335 and/or bus 1340.

At 1710, the method may include transmitting a second set of multiple sets of SSB signals via a second antenna port corresponding to a second polarization, where the second set of multiple sets of SSB signals are transmitted using respective directional beams of the set of directional beams (e.g., each set of SSB signals in the second plurality of SSB signal sets may be transmitted using a different directional beam of the set of directional beams). The operations of 1710 may be performed in accordance with examples as disclosed herein. In some examples, aspects of the operations of 1710 may be performed by an SSB transmitter 1225 as described with reference to FIG. 12. Additionally or alternatively, means for performing 1710 may, but not necessarily, include, for example, antenna 1315, transceiver 1310, communications manager 1320, memory 1325 (including code 1330), processor 1335 and/or bus 1340.

At 1715, the method may include receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization. The operations of 1715 may be performed in accordance with examples as disclosed herein. In some examples, aspects of the operations of 1715 may be performed by a beam report component 1230 as described with reference to FIG. 12. Additionally or alternatively, means for performing 1715 may, but not necessarily, include, for example, antenna 1315, transceiver 1310, communications manager 1320, memory 1325 (including code 1330), processor 1335 and/or bus 1340.

Figure 18:
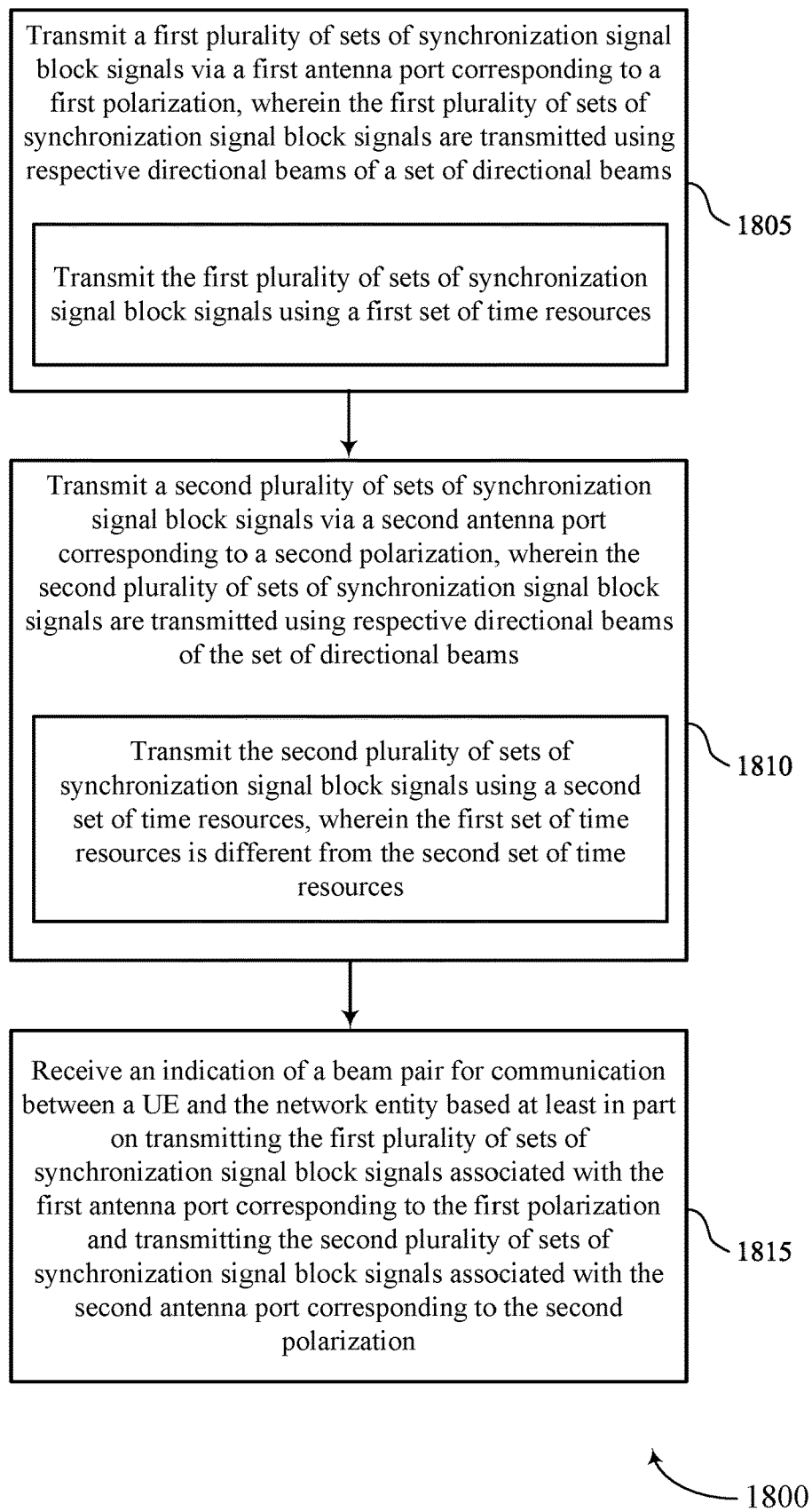

FIG. 18 shows a flowchart illustrating a method 1800 that supports beam management using enhanced SSB signaling in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first set of multiple sets of SSB signals via a first antenna port corresponding to a first polarization, where the first set of multiple sets of SSB signals are transmitted using respective directional beams of a set of directional beams (e.g., each set of SSB signals in the first plurality of SSB signal sets may be transmitted using a different directional beam of the set of directional beams). In some examples, transmitting the first set of multiple sets of SSBs includes transmitting the first set of multiple sets of SSB signals using a first set of time resources. The operations of 1805 may be performed in accordance with examples as disclosed herein. In some examples, aspects of the operations of 1805 may be performed by an SSB transmitter 1225 as described with reference to FIG. 12. Additionally or alternatively, means for performing 1805 may, but not necessarily, include, for example, antenna 1315, transceiver 1310, communications manager 1320, memory 1325 (including code 1330), processor 1335 and/or bus 1340.

At 1810, the method may include transmitting a second set of multiple sets of SSB signals via a second antenna port corresponding to a second polarization, where the second set of multiple sets of SSB signals are transmitted using respective directional beams of the set of directional beams (e.g., each set of SSB signals in the second plurality of SSB signal sets may be transmitted using a different directional beam of the set of directional beams). In some examples, transmitting the second set of multiple sets of SSB signals includes transmitting the second set of multiple sets of SSB signals using a second set of time resources, where the first set of time resources is different from the second set of time resources. The operations of 1810 may be performed in accordance with examples as disclosed herein. In some examples, aspects of the operations of 1810 may be performed by an SSB transmitter 1225 as described with reference to FIG. 12. Additionally or alternatively, means for performing 1810 may, but not necessarily, include, for example, antenna 1315, transceiver 1310, communications manager 1320, memory 1325 (including code 1330), processor 1335 and/or bus 1340.

At 1815, the method may include receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization. The operations of 1815 may be performed in accordance with examples as disclosed herein. In some examples, aspects of the operations of 1815 may be performed by a beam report component 1230 as described with reference to FIG. 12. Additionally or alternatively, means for performing 1815 may, but not necessarily, include, for example, antenna 1315, transceiver 1310, communications manager 1320, memory 1325 (including code 1330), processor 1335 and/or bus 1340.

Figure 19:
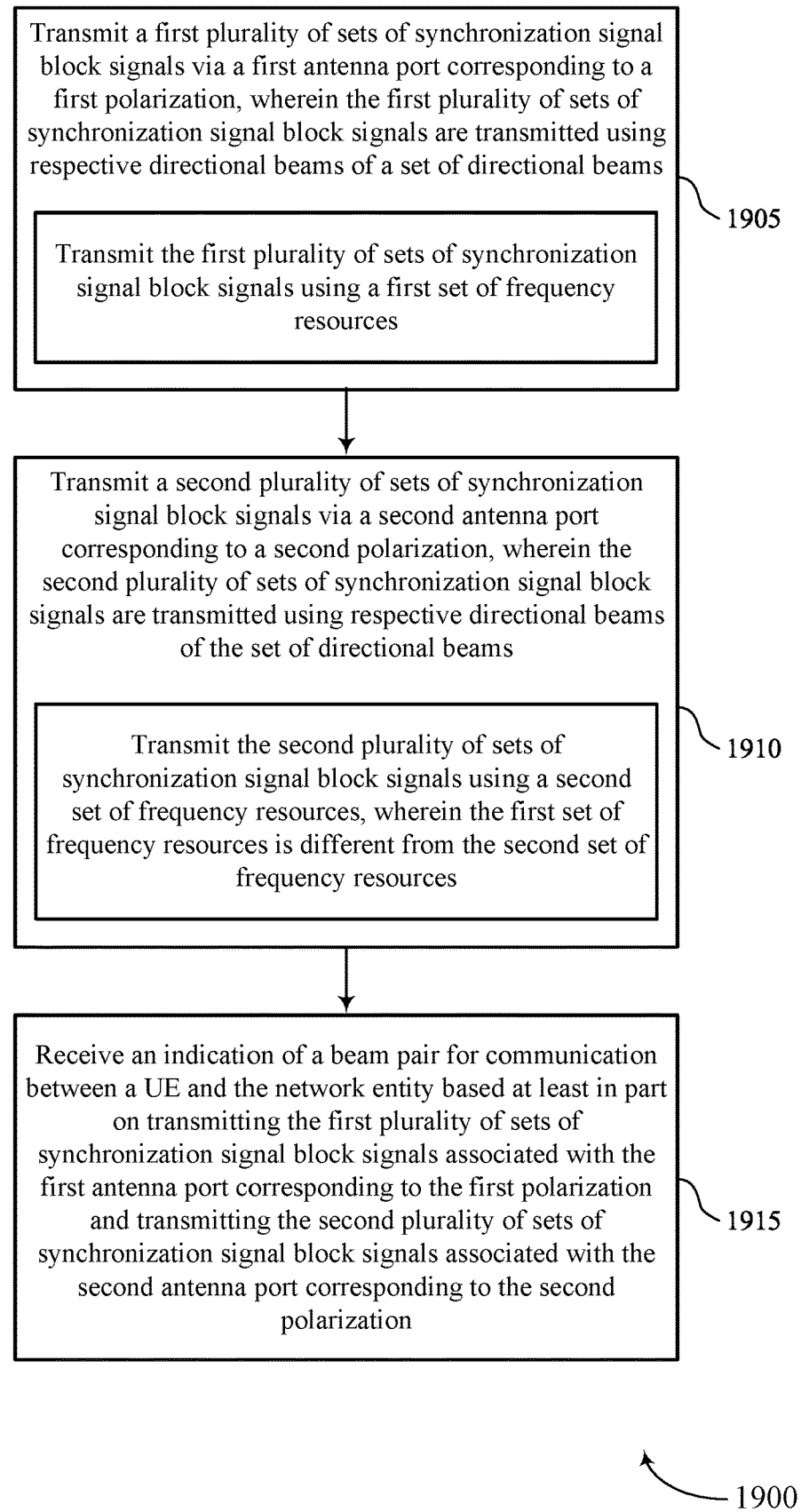

FIG. 19 shows a flowchart illustrating a method 1900 that supports beam management using enhanced SSB signaling in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a first set of multiple sets of SSB signals via a first antenna port corresponding to a first polarization, where the first set of multiple sets of SSB signals are transmitted using respective directional beams of a set of directional beams (e.g., each set of SSB signals in the first plurality of SSB signal sets may be transmitted using a different directional beam of the set of directional beams). In some examples, transmitting the first set of multiple sets of SSB signals includes transmitting the first set of multiple sets of SSB signals using a first set of frequency resources. The operations of 1905 may be performed in accordance with examples as disclosed herein. In some examples, aspects of the operations of 1905 may be performed by an SSB transmitter 1225 as described with reference to FIG. 12. Additionally or alternatively, means for performing 1905 may, but not necessarily, include, for example, antenna 1315, transceiver 1310, communications manager 1320, memory 1325 (including code 1330), processor 1335 and/or bus 1340.

At 1910, the method may include transmitting a second set of multiple sets of SSB signals via a second antenna port corresponding to a second polarization, where the second set of multiple sets of SSB signals are transmitted using respective directional beams of the set of directional beams (e.g., each set of SSB signals in the second plurality of SSB signal sets may be transmitted using a different directional beam of the set of directional beams). In some examples, transmitting the second set of multiple sets of SSB signals includes transmitting the second set of multiple sets of SSB signals using a second set of frequency resources, where the first set of frequency resources is different from the second set of frequency resources. The operations of 1910 may be performed in accordance with examples as disclosed herein. In some examples, aspects of the operations of 1910 may be performed by an SSB transmitter 1225 as described with reference to FIG. 12. Additionally or alternatively, means for performing 1910 may, but not necessarily, include, for example, antenna 1315, transceiver 1310, communications manager 1320, memory 1325 (including code 1330), processor 1335 and/or bus 1340.

At 1915, the method may include receiving an indication of a beam pair for communication between a UE and the network entity based on transmitting the first set of multiple sets of SSB signals associated with the first antenna port corresponding to the first polarization and transmitting the second set of multiple sets of SSB signals associated with the second antenna port corresponding to the second polarization. The operations of 1915 may be performed in accordance with examples as disclosed herein. In some examples, aspects of the operations of 1915 may be performed by a beam report component 1230 as described with reference to FIG. 12. Additionally or alternatively, means for performing 1915 may, but not necessarily, include, for example, antenna 1315, transceiver 1310, communications manager 1320, memory 1325 (including code 1330), processor 1335 and/or bus 1340.

The following provides an overview of aspects of the present disclosure:

Aspect 1: A method for wireless communication at a UE, comprising: receiving a first plurality of sets of SSB signals from a network entity, wherein the first plurality of sets of SSB signals are associated with a first antenna port of the network entity corresponding to a first polarization and are associated with respective directional beams of a set of directional beams; receiving a second plurality of sets of SSB signals from the network entity, wherein the second plurality of sets of SSB signals are associated with a second antenna port of the network entity corresponding to a second polarization and are associated with respective directional beams of the set of directional beams; and transmitting an indication of a beam pair for communication between the UE and the network entity based at least in part on receiving the first plurality of sets of SSB signals associated with the first antenna port corresponding to the first polarization and receiving the second plurality of sets of SSB signals associated with the second antenna port corresponding to the second polarization.

Aspect 2: The method of aspect 1, wherein receiving the first plurality of sets of SSB signals comprises receiving the first plurality of sets of SSB signals using a first set of time resources; and receiving the second plurality of sets of SSB signals comprises receiving the second plurality of sets of SSB signals using a second set of time resources, wherein the first set of time resources is different from the second set of time resources.

Aspect 3: The method of any of aspects 1 and 2, wherein receiving the first plurality of sets of SSB signals comprises receiving the first plurality of sets of SSB signals using a first set of frequency resources; and receiving the second plurality of sets of SSB signals comprises receiving the second plurality of sets of SSB signals using a second set of frequency resources, wherein the first set of frequency resources is different from the second set of frequency resources.

Aspect 4: The method of any of aspects 1 through 3, wherein receiving the first plurality of sets of SSB signals comprises using a first receive beam to receive a first set of SSB signals associated with a first transmit beam of the network entity, the first transmit beam included in the set of directional beams; and receiving the second plurality of sets of SSB signals comprises using the first receive beam to receive a second set of SSB signals associated with the first transmit beam of the network entity.

Aspect 5: The method of aspect 1, wherein receiving the second plurality of sets of SSB signals comprises: receiving, after receiving a first set of SSB signals included in the first plurality of sets and prior to receiving a second set of SSB signals included in the first plurality of sets, a third set of SSB signals included in the second plurality of sets, wherein the third set of SSB signals is associated with a same directional beam of the set of directional beams as the first set of SSB signals.

Aspect 6: The method of aspect 1, wherein receiving the second plurality of sets of SSB signals comprises: receiving, via a first set of time resources that at least partially overlaps with a second set of time resources used to receive a first set of SSB signals included in the first plurality of sets, a second set of SSB signals included in the second plurality of sets.

Aspect 7: The method of aspect 6, wherein a first set of frequency resources used to receive the first set of SSB signals is different from a second set of frequency resources used to receive the second set of SSB signals.

Aspect 8: The method of any of aspects 1 through 7, further comprising: selecting the beam pair based at least in part on measurements of the first plurality of sets of SSB signals and measurements of the second plurality of sets of SSB signals.

Aspect 9: The method of any of aspects 1 through 8, wherein one of the first polarization and the second polarization comprises a vertical polarization, and another of the first polarization and the second polarization comprises a horizontal polarization.

Aspect 10: A method for wireless communication at a network entity, comprising: transmitting a first plurality of sets of SSB signals via a first antenna port corresponding to a first polarization, wherein the first plurality of sets of SSB signals are transmitted using respective directional beams of a set of directional beams; transmitting a second plurality of sets of SSB signals via a second antenna port corresponding to a second polarization, wherein the second plurality of sets of SSB signals are transmitted using respective directional beams of the set of directional beams; and receiving an indication of a beam pair for communication between a UE and the network entity based at least in part on transmitting the first plurality of sets of SSB signals associated with the first antenna port corresponding to the first polarization and transmitting the second plurality of sets of SSB signals associated with the second antenna port corresponding to the second polarization.

Aspect 11: The method of aspect 10, wherein transmitting the first plurality of sets of SSBs comprises transmitting the first plurality of sets of SSB signals using a first set of time resources; and transmitting the second plurality of sets of SSB signals comprises transmitting the second plurality of sets of SSB signals using a second set of time resources, wherein the first set of time resources is different from the second set of time resources.

Aspect 12: The method of any of aspects 10 and 11, wherein transmitting the first plurality of sets of SSB signals comprises transmitting the first plurality of sets of SSB signals using a first set of frequency resources; and transmitting the second plurality of sets of SSB signals comprises transmitting the second plurality of sets of SSB signals using a second set of frequency resources, wherein the first set of frequency resources is different from the second set of frequency resources.

Aspect 13: The method of any of aspects 10 through 12, wherein transmitting the first plurality of sets of SSB signals comprises transmitting a first set of SSB signals via the first antenna port using a first transmit beam of the set of directional beams the first transmit beam included in the set of directional beams; and transmitting the second plurality of sets of SSB signals comprises transmitting a second set of SSB signals via the second antenna port using the first transmit beam.

Aspect 14: The method of aspect 10, wherein transmitting the second plurality of sets of SSB signals comprises: transmitting, after transmitting a first set of SSB signals included in the first plurality of sets and prior to transmitting a second set of SSB signals included in the first plurality of sets, a third set of SSB signals included in the second plurality of sets, wherein the third set of SSB signals is transmitted using a same directional beam of the set of directional beams as the first set of SSB signals.

Aspect 15: The method of aspect 10, wherein transmitting the second plurality of sets of SSB signals comprises: transmitting, via a first set of time resources that at least partially overlaps with a second set of time resources used to transmit a first set of SSB signals included in the first plurality of sets, a second set of SSB signals included in the second plurality of sets.

Aspect 16: The method of aspect 15, wherein a first set of frequency resources used to transmit the first set of SSB signals is different from a second set of frequency resources used to transmit the second set of SSB signals.

Aspect 17: The method of any of aspects 10 through 16, further comprising: generating the first plurality of sets of SSB signals based at least in part on a first precoding matrix; and generating the second plurality of sets of SSB signals based at least in part on a second precoding matrix, wherein a combination of the first precoding matrix and the second precoding matrix comprises a rank-2 precoding matrix.

Aspect 18: The method of any of aspects 10 through 17, wherein one of the first polarization and the second polarization comprises a vertical polarization, and another of the first polarization and the second polarization comprises a horizontal polarization.

Aspect 19: An apparatus for wireless communication at a UE, comprising a memory, a transceiver, and at least one processor coupled with the memory and the transceiver, the at least one processor configured to perform a method of any of aspects 1 through 9.

Aspect 20: An apparatus for wireless communication at a UE, comprising at least one means for performing a method of any of aspects 1 through 9.

Aspect 21: A non-transitory computer-readable medium storing code for wireless communication at a UE, the code comprising instructions executable by a processor to perform a method of any of aspects 1 through 9.

Aspect 22: An apparatus for wireless communication at a network entity, comprising a memory, a transceiver, and at least one processor coupled with the memory and the transceiver, the at least one processor configured to perform a method of any of aspects 10 through 18.

Aspect 23: An apparatus for wireless communication at a network entity, comprising at least one means for performing a method of any of aspects 10 through 18.

Aspect 24: A non-transitory computer-readable medium storing code for wireless communication at a network entity, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, as part of a beam management procedure, a first plurality of sets of synchronization signal block signals from a network entity, wherein the first plurality of sets of synchronization signal block signals are associated with a first antenna port of the network entity, the first plurality of sets of synchronization signal block signals having a first polarization and corresponding to a plurality of directional transmit beams associated with the network entity;
receiving, as part of the beam management procedure, a second plurality of sets of synchronization signal block signals from the network entity, wherein the second plurality of sets of synchronization signal block signals are associated with a second antenna port of the network entity, the second plurality of sets of synchronization signal block signals having a second polarization and corresponding to the plurality of directional transmit beams;
transmitting, as part of the beam management procedure, an indication of a beam pair for communication between the UE and the network entity based at least in part on receiving the first plurality of sets of synchronization signal block signals and receiving the second plurality of sets of synchronization signal block signals, wherein the indicated beam pair corresponds to a synchronization signal block pair that has a highest combined signal strength, the synchronization signal block pair comprising a first set of synchronization signal block signals from among the first plurality and a second set of synchronization signal block signals from among the second plurality; and
performing, based at least in part on the beam management procedure, multiple-input, multiple-output (MIMO) communications with the network entity using the beam pair, wherein a first data stream of the MIMO communications is associated with the first polarization and a second data stream of the MIMO communications is associated with the second polarization.

2. The method of claim 1, wherein:
receiving the first plurality of sets of synchronization signal block signals comprises receiving the first plurality of sets of synchronization signal block signals using a first set of time resources; and
receiving the second plurality of sets of synchronization signal block signals comprises receiving the second plurality of sets of synchronization signal block signals using a second set of time resources, wherein the first set of time resources is different from the second set of time resources.

3. The method of claim 1, wherein:
receiving the first plurality of sets of synchronization signal block signals comprises receiving the first plurality of sets of synchronization signal block signals using a first set of frequency resources; and
receiving the second plurality of sets of synchronization signal block signals comprises receiving the second plurality of sets of synchronization signal block signals using a second set of frequency resources, wherein the first set of frequency resources is different from the second set of frequency resources.

4. The method of claim 1, wherein:
receiving the first plurality of sets of synchronization signal block signals comprises using a first receive beam to receive a first set of synchronization signal block signals associated with a first transmit beam of the network entity, the first transmit beam included in the plurality of directional transmit beams; and
receiving the second plurality of sets of synchronization signal block signals comprises using the first receive beam to receive a second set of synchronization signal block signals associated with the first transmit beam of the network entity.

5. The method of claim 1, wherein receiving the second plurality of sets of synchronization signal block signals comprises:
receiving, after receiving a first set of synchronization signal block signals included in the first plurality of sets and prior to receiving a second set of synchronization signal block signals included in the first plurality of sets, a third set of synchronization signal block signals included in the second plurality of sets, wherein the third set of synchronization signal block signals is associated with a same directional transmit beam of the plurality of directional transmit beams as the first set of synchronization signal block signals.

6. The method of claim 1, wherein receiving the second plurality of sets of synchronization signal block signals comprises:
receiving, via a first set of time resources that at least partially overlaps with a second set of time resources used to receive a first set of synchronization signal block signals included in the first plurality of sets, a second set of synchronization signal block signals included in the second plurality of sets.

7. The method of claim 6, wherein a first set of frequency resources used to receive the first set of synchronization signal block signals is different from a second set of frequency resources used to receive the second set of synchronization signal block signals.

8. The method of claim 1, further comprising:
selecting the beam pair based at least in part on measurements of the first plurality of sets of synchronization signal block signals and measurements of the second plurality of sets of synchronization signal block signals.

9. The method of claim 1, wherein one of the first polarization and the second polarization comprises a vertical polarization, and wherein another of the first polarization and the second polarization comprises a horizontal polarization.

10. A method for wireless communication at a network entity, comprising:
transmitting, as part of a beam management procedure, a first plurality of sets of synchronization signal block signals via a first antenna port using a first polarization and a plurality of directional transmit beams;
transmitting, as part of the beam management procedure, a second plurality of sets of synchronization signal block signals via a second antenna port using a second polarization and the plurality of directional transmit beams;
receiving, as part of the beam management procedure, an indication of a beam pair for communication between a user equipment (UE) and the network entity based at least in part on transmitting the first plurality of sets of synchronization signal block signals and transmitting the second plurality of sets of synchronization signal block signals, wherein the indicated beam pair corresponds to a synchronization signal block pair that has a highest combined signal strength, the synchronization signal block pair comprising a first set of synchronization signal block signals from among the first plurality and a second set of synchronization signal block signals from among the second plurality; and performing, based at least in part on the beam management procedure, multiple-input, multiple-output (MIMO) communications with the UE using the beam pair, wherein a first data stream of the MIMO communications is associated with the first polarization and a second data stream of the MIMO communications is associated with the second polarization.

11. The method of claim 10, wherein:
transmitting the first plurality of sets of synchronization signal blocks comprises transmitting the first plurality of sets of synchronization signal block signals using a first set of time resources; and
transmitting the second plurality of sets of synchronization signal block signals comprises transmitting the second plurality of sets of synchronization signal block signals using a second set of time resources, wherein the first set of time resources is different from the second set of time resources.

12. The method of claim 10, wherein:
transmitting the first plurality of sets of synchronization signal block signals comprises transmitting the first plurality of sets of synchronization signal block signals using a first set of frequency resources; and
transmitting the second plurality of sets of synchronization signal block signals comprises transmitting the second plurality of sets of synchronization signal block signals using a second set of frequency resources, wherein the first set of frequency resources is different from the second set of frequency resources.

13. The method of claim 10, wherein:
transmitting the first plurality of sets of synchronization signal block signals comprises transmitting a first set of synchronization signal block signals via the first antenna port using a first transmit beam of the plurality of directional transmit beams; and
transmitting the second plurality of sets of synchronization signal block signals comprises transmitting a second set of synchronization signal block signals via the second antenna port using the first transmit beam.

14. The method of claim 10, wherein transmitting the second plurality of sets of synchronization signal block signals comprises:
transmitting, after transmitting a first set of synchronization signal block signals included in the first plurality of sets and prior to transmitting a second set of synchronization signal block signals included in the first plurality of sets, a third set of synchronization signal block signals included in the second plurality of sets, wherein the third set of synchronization signal block signals is transmitted using a same directional transmit beam of the plurality of directional transmit beams as the first set of synchronization signal block signals.

15. The method of claim 10, wherein transmitting the second plurality of sets of synchronization signal block signals comprises:
transmitting, via a first set of time resources that at least partially overlaps with a second set of time resources used to transmit a first set of synchronization signal block signals included in the first plurality of sets, a second set of synchronization signal block signals included in the second plurality of sets.

16. The method of claim 15, wherein a first set of frequency resources used to transmit the first set of synchronization signal block signals is different from a second set of frequency resources used to transmit the second set of synchronization signal block signals.

17. The method of claim 10, further comprising:
generating the first plurality of sets of synchronization signal block signals based at least in part on a first precoding matrix; and
generating the second plurality of sets of synchronization signal block signals based at least in part on a second precoding matrix, wherein a combination of the first precoding matrix and the second precoding matrix comprises a rank-2 precoding matrix.

18. The method of claim 10, wherein one of the first polarization and the second polarization comprises a vertical polarization, and wherein another of the first polarization and the second polarization comprises a horizontal polarization.

19. A user equipment (UE) for wireless communication, comprising:
one or more memories storing processor-executable code;
a transceiver; and
one or more processors coupled with the one or more memories and the transceiver, the one or more processors configured to cause the UE to:
receive, via the transceiver and as part of a beam management procedure, a first plurality of sets of synchronization signal block signals from a network entity, wherein the first plurality of sets of synchronization signal block signals are associated with a first antenna port of the network entity, the first plurality of sets of synchronization signal block signals having a first polarization and corresponding to a plurality of directional transmit beams associated with the network entity;
receive, via the transceiver and as part of the beam management procedure, a second plurality of sets of synchronization signal block signals from the network entity, wherein the second plurality of sets of synchronization signal block signals are associated with a second antenna port of the network entity, the second plurality of sets of synchronization signal block signals having a second polarization and corresponding to the plurality of directional transmit beams;
transmit, via the transceiver and as part of the beam management procedure, an indication of a beam pair for communication between the UE and the network entity based at least in part on receiving the first plurality of sets of synchronization signal block signals and receiving the second plurality of sets of synchronization signal block signals, wherein the indicated beam pair corresponds to a synchronization signal block pair that has a highest combined signal strength, the synchronization signal block pair comprising a first set of synchronization signal block signals from among the first plurality and a second set of synchronization signal block signals from among the second plurality; and
perform, via the transceiver and as part of the beam management procedure, multiple-input, multiple-output (MIMO) communications with the network entity using the beam pair, wherein a first data stream of the MIMO communications is associated with the first polarization and a second data stream of the MIMO communications is associated with the second polarization.

20. The UE of claim 19, wherein:

to receive the first plurality of sets of synchronization signal block signals, the one or more processors are configured to cause the UE to receive, via the transceiver, the first plurality of sets of synchronization signal block signals using a first set of time resources; and to receive the second plurality of sets of synchronization signal block signals, the one or more processors are configured to cause the UE to receive, via the transceiver, the second plurality of sets of synchronization signal block signals using a second set of time resources, wherein the first set of time resources is different from the second set of time resources.

* * * * *